United States Patent [19]

Sugaya

[11] Patent Number: 5,278,712
[45] Date of Patent: Jan. 11, 1994

[54] REMOVABLE DISK DRIVE HAVING TWO HEADS FORMED WITH A GIMBAL STRUCTURE

[75] Inventor: Toshihiro Sugaya, Ibaraki, Japan
[73] Assignee: Kabushiki Kaisha Toshiba, Kawasaki, Japan
[21] Appl. No.: 733,167
[22] Filed: Jul. 19, 1991

[30] Foreign Application Priority Data

Jul. 19, 1990 [JP] Japan ................................ 2-189508
Oct. 30, 1990 [JP] Japan ................................ 2-290736

[51] Int. Cl.$^5$ ........................... G11B 5/00; G11B 5/48
[52] U.S. Cl. ..................... 360/104; 360/97.04; 360/105; 360/48; 369/72; 369/287
[58] Field of Search ............... 360/81, 32, 104, 105, 360/106, 61, 51, 48, 133, 87.04; 369/100, 275.1, 72, 287; 358/343

[56] References Cited

U.S. PATENT DOCUMENTS

| | | | |
|---|---|---|---|
| 4,151,573 | 4/1979 | Tandon et al. | 360/104 |
| 4,194,228 | 3/1980 | Duff | 360/133 |
| 4,263,630 | 4/1981 | Pierson | 360/104 |
| 4,419,704 | 12/1983 | Radman et al. | 360/102 |
| 4,755,889 | 7/1988 | Schwartz | 360/32 |
| 4,758,899 | 7/1988 | Tsukiyama | 360/32 |
| 4,851,933 | 7/1989 | Sugaya et al. | 360/61 |
| 5,032,927 | 7/1991 | Watanabe et al. | 358/335 |
| 5,057,953 | 10/1991 | Wanlass | 360/104 |
| 5,115,363 | 5/1992 | Khan et al. | 360/104 |
| 5,164,839 | 11/1992 | Lang | 360/8 |
| 5,212,679 | 5/1993 | Tohkairin | 369/721 |

OTHER PUBLICATIONS

The 1991 IEICE Spring Conference; "Head to Media Interface in Floppy Disks Using Hard Disk Head", Toshihiro Sugaya.

Primary Examiner—Constantine Hannaher
Assistant Examiner—Kim-Kwok Chu
Attorney, Agent, or Firm—Oblon, Spivak, McClelland, Maier & Neustadt

[57] ABSTRACT

A removable disk system includes a disk which can be recorded on both surfaces thereof and a disk drive for recording input data on tracks on both surfaces of the disk. The disk drive includes head means having two heads for recording information on both surfaces of the disk, the disk is a selectively replaceable disk on which servo information for positioning the head is recorded, the head means is formed with a gimbal structure having liners for holding the disk therebetween by pressing the recording surfaces thereof towards each other and a symmetrical member for moving the heads towards the flexible disk held between the liners from both sides thereof and setting the heads in contact with the flexible disk and the liners maintain the contact state between the heads and flexible disk set up by the gimbal structure and the contact position is defined by the servo information.

14 Claims, 20 Drawing Sheets

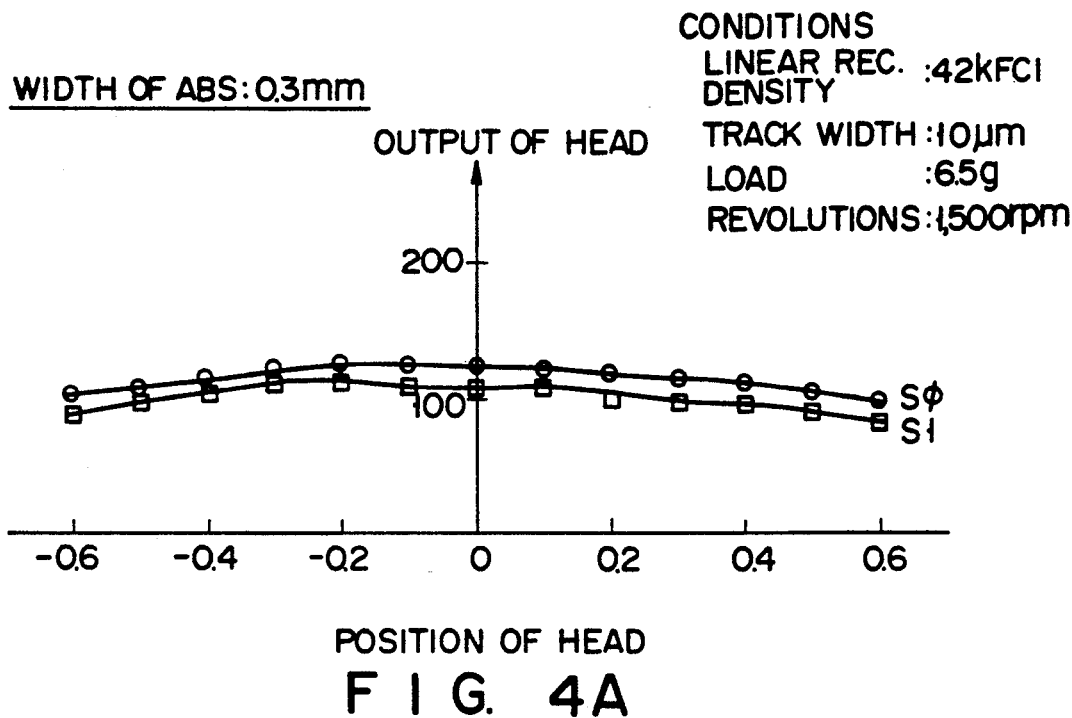
F I G. 4A
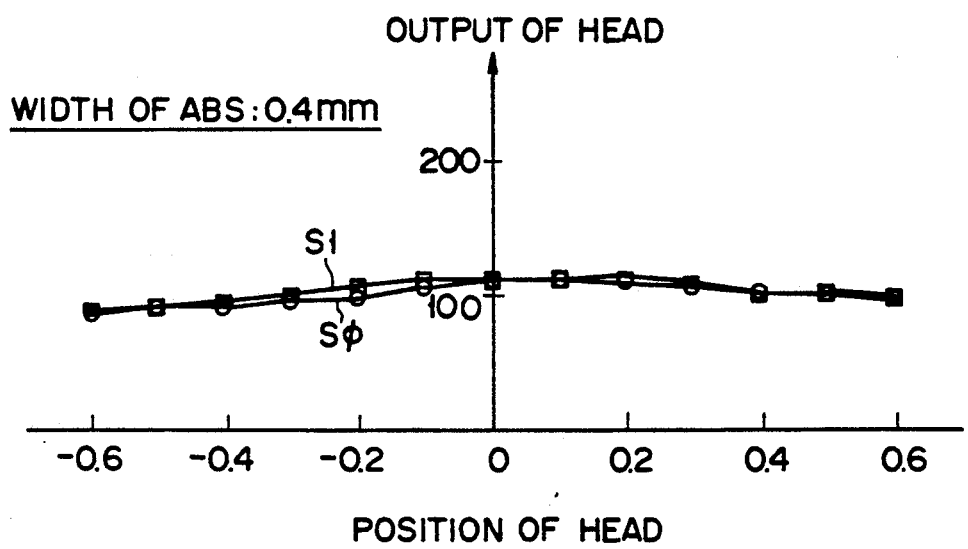
F I G. 4B

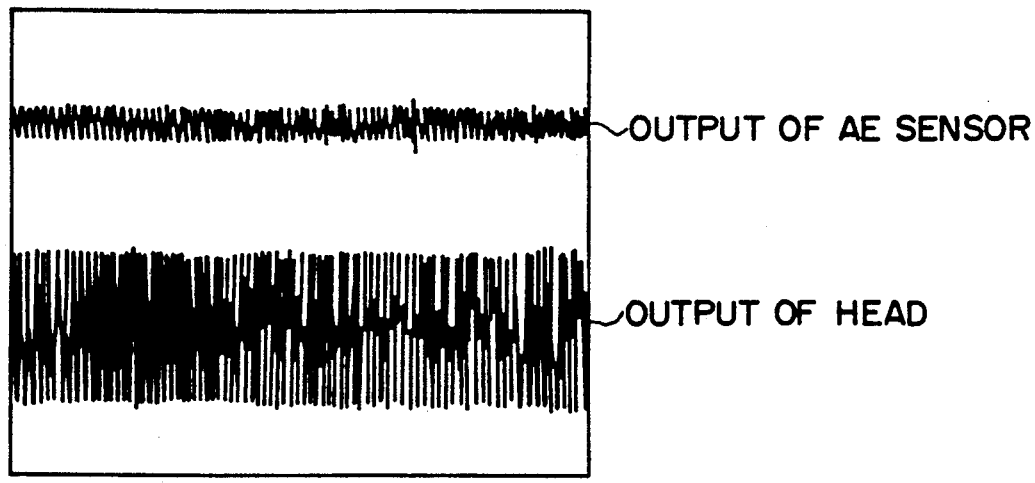
OUTPUT OF HEAD AFTER
2100S PASS TEST
(1,500 rpm, LOAD 15g)
F I G. 6A
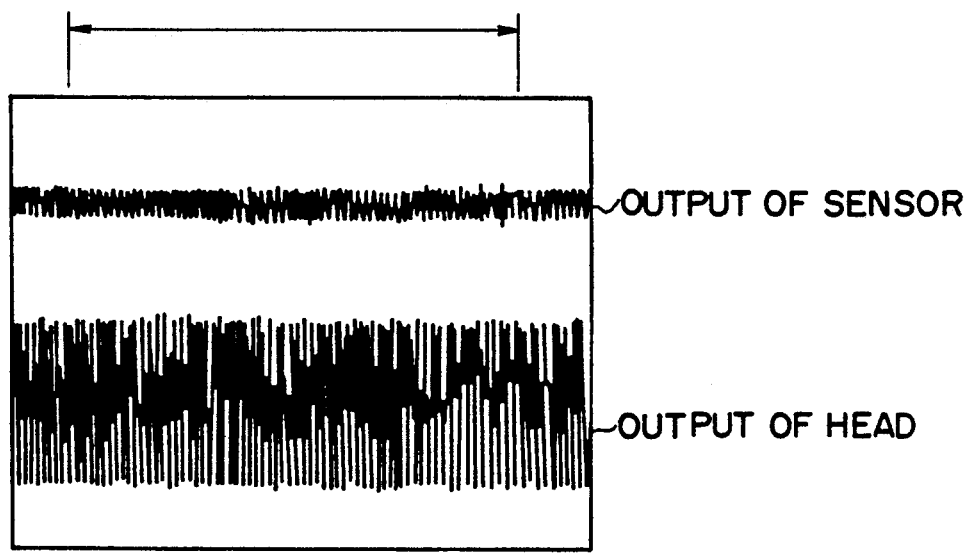
OUTPUT OF HEAD IN OUTER SIDE
TRACK FROM TEST POSITION
(1,500 rpm, LOAD 15g)
F I G. 6B

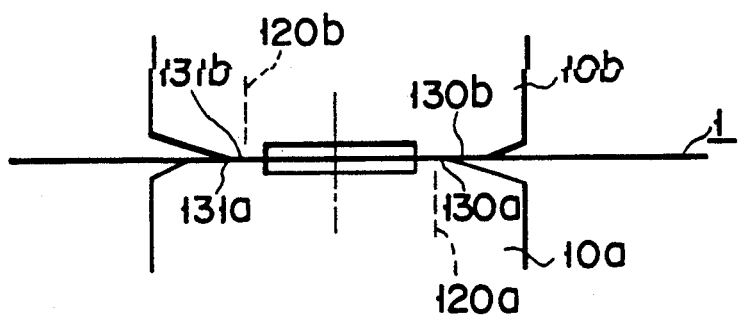
FIG. 13A  REVOLUTION: LOW SPEED
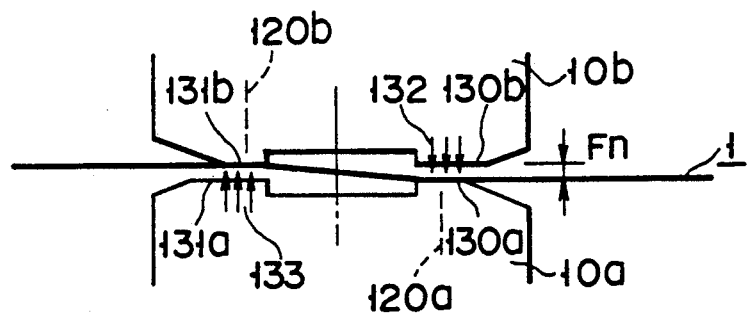
FIG. 13B  MID. SPEED
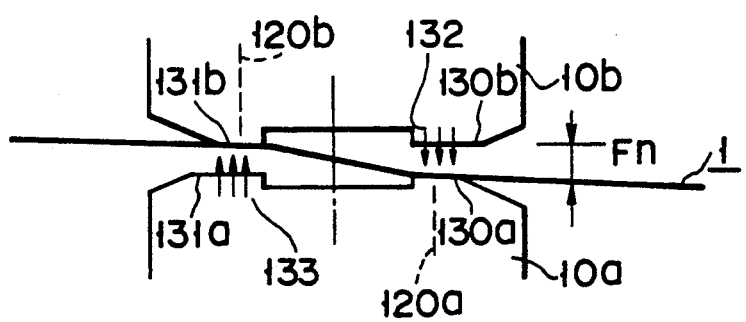
FIG. 13C  HIGH SPEED

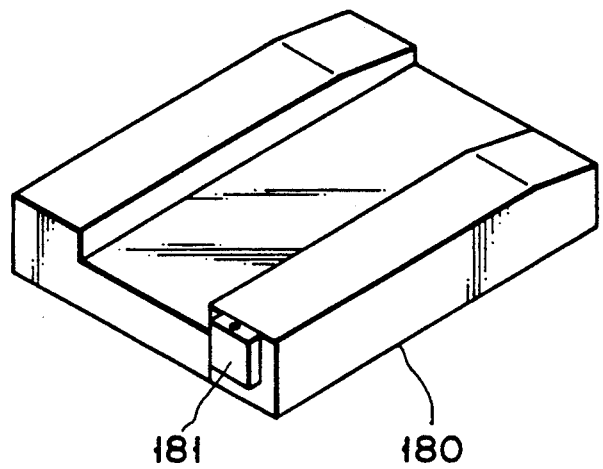
F I G. 18

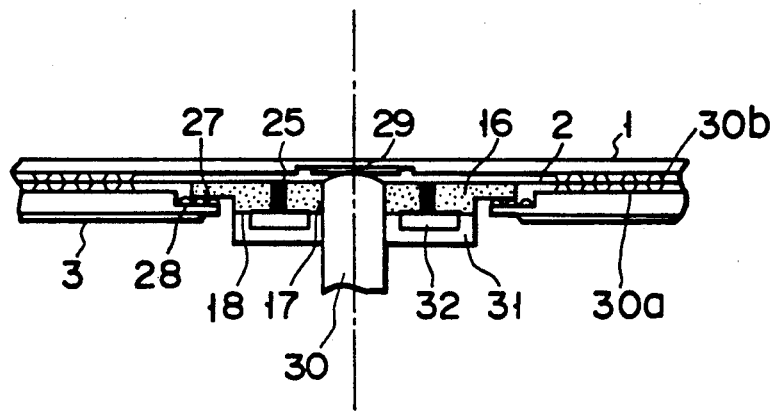
F I G. 20
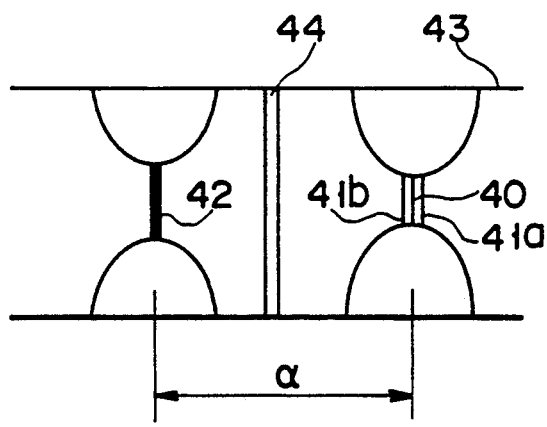
F I G. 21

REMOVABLE DISK DRIVE HAVING TWO HEADS FORMED WITH A GIMBAL STRUCTURE

BACKGROUND OF THE INVENTION

1. Field of the Invention

This invention relates to a disk system in which a disk used as a recording medium can be replaced and to a recording medium and a disk drive for recording an audio signal in the form of a digital signal.

2. Description of the Related Art

With the formation of a computer system of even greater miniaturization and higher performance, requirements for the large capacity, high speed, miniaturization, light-weight and low cost of the removable magnetic disk system have become further stronger. In general, the removable magnetic disk system may be roughly divided into three types, a floppy disk drive (FDD), a removable hard disk drive (HDD), and a Bernoulli flexible disk drive. Among them, the FDD is widely used because of its low cost and easy handling.

However, since the FDD has a small capacity and low rotation speed, the data transfer speed and access speed will become low. One of the main reasons why the capacity is small is that the conventional FDD is driven according to the non-tracking servo system and the operation thereof cannot follow the expansion and contraction of a flexible medium due to the temperature and moisture so that the track density cannot be increased. However, recently, a high track density recording technique has been developed by use of a tracking servo system. Further, the above problem is caused by a difference between the magnetic head systems. The rotation speed of the FDD is normally 300 to 360 rpm and is lower than that of the HDD by one digit. This is because the head is used in contact with the medium and it is impossible to attain a long service life of the medium if the rotation speed of the FDD is set as high as that of the HDD in which the head is set apart or floated from the medium.

Initially, there are two types of double-sided head systems of the FDD. One type of the head system is a head suspension system of the HDD and can be obtained by modifying IBM3330 for the FDD service and it is disclosed in U.S. Pat. No. 4,263,630.

The other type of the head system is proposed by Tandon Co. and one of the double-sided heads is fixed and the other head is formed with a gimbal structure. This type of head system is disclosed in U.S. Pat. No. 4,151,573.

Double-sided head systems of the FDD which are now widely used are constituted to attain the "head touch" on both sides of the medium by setting the medium in contact with sliders provided on both sides thereof. Therefore, large friction occurs between the head and the medium and a spindle motor for rotating the disk is required to have large torque. Thus, it is understood that the above head system is not preferable from the viewpoint of the durability of the medium.

The mechanical size and mass of the head system of the FDD are larger than those of the head system of the HDD. Therefore, the movable portion of the head positioner becomes large and the mass thereof becomes large so that it will be difficult to attain a high seek speed.

The double-sided magnetic head system of the FDD maintains the head touch by holding the medium by use of the head sliders. The head gap lies at substantially the central portion of the slider. With the above bulk type magnetic head, it is difficult to precisely control the track width and gap length in the manufacturing process. For this reason, even if the positioning error can be reduced by use of the tracking servo system, it is difficult to enhance the track density because the track widths of the devices are different. Further, there occurs a problem that large OWM (Over Write modulation) noises due to the difference in the gap length are generated.

The removable HDD is advantageous over the FDD in that a large capacity and high-speed access can be attained, but at the same time it has disadvantages that the disk cartridge is expensive and there is a possibility that head crash may be caused by dust, adhesion, mechanical shock and the like. Further, since the head is set apart or floated from the disk when it is in use, spacing loss occurs, thereby making it impossible to enhance the linear recording density. Generally, the most serious problem of not only the removable HDD but also the other HDD is the head crash and the problem occurs as an essential defect of the HDD caused by the rigidity of the disk itself. Particularly, in the removable HDD, a larger amount of dusts are introduced into the HDA (head disk assembly) in comparison with a case of the fixed type HDD and therefore the possibility of head crash becomes higher accordingly.

The head assembly of IBM3370 type is simple in construction and the rigidity of the suspension is high in comparison with a head assembly shown in FIG. 20.

Generally, it is preferable to set the floating distance as small as possible from the viewpoint of high-density recording, but if the floating distance is set excessively small, the head comes into contact with the disk surface and the durability of the medium cannot be kept high. Further, adhesion occurs in CSS (Contact Start Stop) when the profile irregularity is improved.

As described above, since the head of the hard disk is floated with an extremely small floating distance, head crash may be caused when dust is introduced between the disk and ABS (Air Bearing Slider) even if the size of the dust is of the order of submicrons.

The IBM3370 type head assembly sufficiently follows the surface deflection of the hard disk and still exhibits high rigidity. Therefore, high track density can be easily attained by the tracking servo in the HDD. However, the head crash due to dust develops into a further serious problem in the removable HDD in comparison with the normal fixed type HDD. In the case of the removable HDD, a hermetically sealed structure for preventing dust from entering the cartridge is used, but since the shutter is opened or closed for head loading, it is difficult to prevent entrance of dust of the order of submicrons. Further, since a cartridge having dust adhered thereon is loaded into the drive, it is impossible to clean the internal portion of the HDA (head disk assembly) unlike the fixed type HDD. Therefore, the removable HDD is less reliable than the fixed type HDD, and if the problem associated with dust cannot be solved, the floating distance cannot be reduced, thereby making it impossible to enhance the recording density.

Then, a Bernoulli flexible disk drive has been proposed as a device in which the disk is rotated at a high speed and can be replaced. The basic construction thereof is described in U.S. Pat. No. 4,419,704. Since the head is kept apart from the medium in the Bernoulli type disk drive, the rotation speed can be easily enhanced. However, since a floating gap is made between the head and the medium, a problem that the recording density cannot be enhanced like the normal HDD occurs. Since a flexible disk is used, it is highly resistant to head crash which will occur in the HDD, but the medium will be easily damaged like the HDD when dust is introduced. For this reason, the same filtration as in the removable HDD becomes necessary and the cost thereof becomes high. Further, the head is complicated in construction in comparison with the heads of the conventional FDD and HDD and the cost of the device becomes high. Further, since an R/W gap lies in the central portion of the spherical slider, a thin film head such as the head of the HDD cannot be used. Since the Bernoulli type device is basically a single-sided head type, two disks must be inserted into a single cartridge when a double-sided head is simulatively formed and the disk cartridge becomes expensive.

A digital audio medium may be mainly divided into two types based on the length of time of performance, one type being a compact disk (CD) exclusively used for reproduction and the other type being a digital audio tape (DAT) used for recording and reproduction. In addition to the above two types of media, there is provided a 3.5" floppy disk (3.5" FD) whose recording capacity is small but which is used in personal computers, word processors or musical instruments. Widely used 3.5" FDs are of 2DD and 2HD which use a Co-γ medium and whose unformatted capacities (e.g. UF capacities) are respectively 1 MB and 2 MB. Recently, floppy disks of 2ED (i.e. UF capacity is 4 MB) using a Ba-ferrite vertical recording medium are commercially available and the capacity of the 3.5" FD is rapidly increased. The above driving devices are compatible with lower FDs for read/write.

Further, recently, an FD of large capacity having a formatted capacity (e.g. FT capacity) of 10 MB or more obtained by using tracking servo (which is sector servo in most cases) in the FD so as to enhance the track density to four times that of the conventional case has been experimentally manufactured and developed.

As described above, with popularization of the CD, it becomes natural to convert an audio signal into a digital form. Naturally, the requirement of the users that the audio signal can be easily recorded in a digital form becomes stronger, but the CD, DAT or 3.5" FD cannot fully meet the requirement of the users at present. That is, the medium available at present does not have such a performance and function as to satisfy the users in terms of the size, the easy handling, the degree of protection from dusts, damages and rough handling, the easy transportation, the recording function, the random access function, the repetitive durability, the recording time, the price and the like.

In general, the CD is excellent as a source of digital sound of high quality but has an essential defect that no recording function is provided. Further, it has defects associated with the size, the handling, the transportation, the price and the like. Particularly, the difficulty in handling the same caused by the fact that it is not set inside a cartridge, the difficulty of removing the same from the case, the degree of protection from dust, damage and rough handling are serious problems.

The DAT somewhat compensates for the defects of the CD that no recording function is provided and the handling is difficult, but problems associated with the infringement of copyright of a digital copy and the high price thereof are provided and there is no tendency that it is widely used. The other problems inherent to the DAT are that the "repetitive durability" and "random accessibility" are low and the degree of protection from the dust, damage and rough handling is extremely low because of an incomplete cartridge structure.

Widely used audio media (i.e. audio tapes or the like) have various problems. Since a 3.5" FD is set inside a proper cartridge, it is easily handled and is excellent in the repetitive durability and random accessibility and the price thereof is low. However, the capacity thereof is not large enough to record a sufficiently large amount of audio signals in the digital form. The other problem of the 3.5" FD is that (1) it is impossible to completely prevent dust entrance because there is a gap near the chucking hub, (2) there is a high possibility that dust attached to the shutter are dropped off onto the disk by the shuttering operation, and (3) the medium is easily exposed and may be easily damaged since a lock mechanism of the shutter is not provided.

As described above, it is understood that the removable disk drives have various types of problems. That is, the problems are as follows:

For example, (1) in the case of a floppy disk, problems that the capacity thereof is small and the rotation speed thereof is low are provided.

(2) In the case of a removable HDD, problems associated with an expensive disk cartridge, head crash by the presence of dust, impossibility of enhancing the recording density are provided.

(3) In a Bernoulli type device, in addition to the problems similar to those of the HDD except the problem associated with head crash, there are further provided problems that an expensive head which is complicated in construction is required and two disks are necessary when a double-sided head is simulatively formed.

Further, the above-described 3.5" FDs have various problems. In particular, when a digital audio signal is recorded on the FD, problems that (4) the recording operation can be effected only for approx. 70 seconds and that (5) the recording operation cannot be effected while permitting the user to freely control (i.e. select) the quality of the recording signal even if the recording operation can be effected for several tens of minutes the serious problems.

SUMMARY OF THE INVENTION

An object of this invention is to provide a disk system in which all of the above problems are solved. That is, an object of this invention is to provide a removable disk system which can be easily handled and is less expensive like the FDD and in which the recording operation can be effected with as high density and large capacity as the HDD and the high-speed access can be effected like the HDD.

Another object of this invention is to provide a disk system (i.e. recording device/recording medium) by use of which the user can freely record an audio signal in the digital form.

In this invention, there is provided a removable disk drive in which a disk can be replaced, comprising a flexible disk held between liners; and a tracking servo system for holding the flexible disk between double-sided head systems of gimbal/suspension structure which are symmetrical with respect to the disk surface and setting the position of a head by use of servo information created on the disk surface.

According to a second aspect of this invention, a disk drive for coding input digital data in a compressed form and recording the compression-coded data on a track is a disk system which is characterized in that a plurality of different types of processing means for compression-coding are provided, one of the plurality of processing means is selected, information indicating the type of the selected processing means is recorded on the track of the disk together with data compression-coded by the processing means.

Further, the system of this invention is a disk system which is characterized by comprising two heads for dividing digital data of a preset length into two portions and separately recording the respective two-divided data sections on the front and rear surfaces of the disk.

Further, it is a disk system which is characterized in that each track of the disk is divided by a plurality of sectors and the disk is rotated at the same rotation speed for the tracks having the same number of sectors.

A removable disk system according to this invention has a basic structure constructed by a removable disk as a recording medium device and a disk head for recording and reproduction. More specifically, a flexible disk held between liners and a double-sided head system of symmetrical gimbal/suspension are used.

The double-sided head system having the symmetrical gimbal/suspension follows the surface deflection of the disk according to the movement of the suspension in the Z direction and the rotation in two axial directions of the gimbal. When the rotation speed of the disk is increased, the disk is expanded by the centrifugal force, the rigidity is increased and the surface deflection becomes small. However, since the suspension load is sufficiently larger than the rigidity of the disk, the disk is made flat at portions near the ABS. Therefore, even when the disk is rotated at a high speed, a portion near the head gap will not be floated and it is always kept in contact with the disk so that spacing loss will not occur even if the line density is enhanced. With the movement of the suspension in the Z direction, track offsets in the opposite directions occur on the side-0 and side-1 surfaces, but in this case, the tracking servo system used for enhancing the track density corrects the track position according to servo information and therefore no problem occurs.

Since the flexible disk is always set in contact with the liner, dust attached to the disk are removed by the liner. The flexible disk is highly resistant to dust because of its flexibility and the medium will not be damaged when the disk is rotated at a high speed because of the dust removing effect of the liner, light suspension load and the effect obtained by setting not all of the portion but part of the ABS lying on the disk ejecting side in contact with the disk. Further, since a large surface deflection can be suppressed by holding the disk between the liners, it is not necessary to use means such as a stabilizer.

Therefore, according to this invention, it is possible to provide a removable magnetic disk drive by which high speed and large capacity like the hard disk can be attained and easy handling like the FDD can be attained.

Further, according to this invention, there is provided a removable disk system in which a plurality of different types of compression-coding modes (for example, 256 kbps mode, 128 kbps mode) for compression coding input digital data (audio signal) are previously provided and which is so constructed that a user can freely select a desired mode from the above modes according to input data. Therefore, the recording capacity of the disk can be effectively used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 6B are graphs showing experimental data relating to one embodiment of this invention;

FIGS. 7A to 8B are construction views showing a double-sided head system suspension and offset means of this invention;

FIGS. 12A, 12B, 13A, 13B and 13C are schematic views showing the positional relation between the head slider and the flexible disk;

FIG. 18 is a perspective view showing one embodiment applied to an optical pick-up;

FIG. 20 is a cross sectional view of a cartridge showing the chucking state;

FIG. 21 is an enlarged cross sectional view showing a portion near the gap of a first-erasing type magnetic head;

DETAILED DESCRIPTION OF THE PREFERRED EMBODIMENTS

Figure 1:
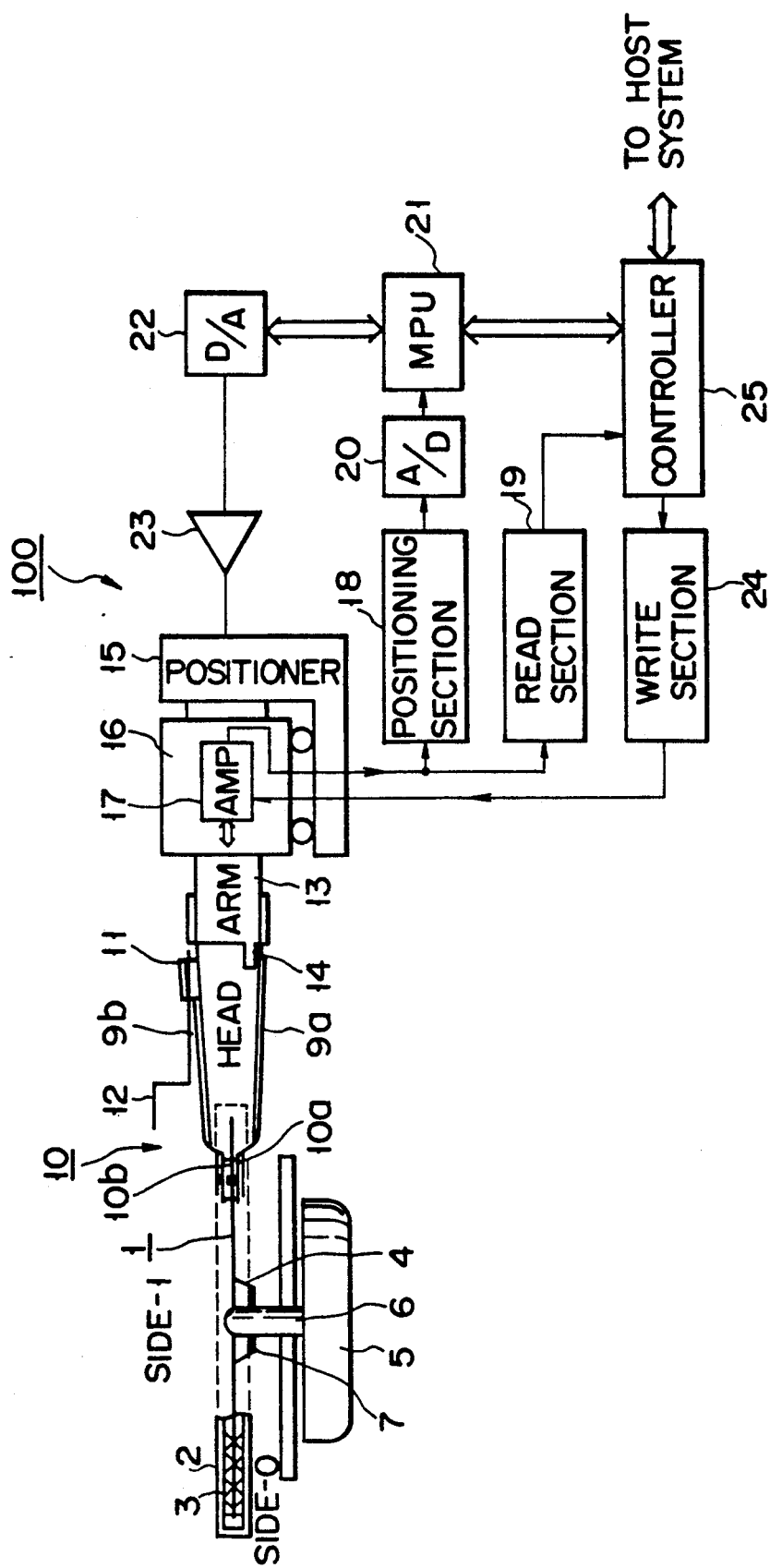
FIG. 1 is a schematic construction view showing one embodiment of a removable magnetic disk drive of this invention.

FIG. 1 is a construction view schematically showing a removable magnetic disk device according to one embodiment of this invention.

A flexible disk 1 has a chucking hub 4, and is held between liners 3 and received in a cartridge case 2. A spindle motor 5 transmits rotation force to a hub base 7 having a magnet partially buried therein via a spindle shaft 6. The rear surface 9a of the disk is called "side-0"

and the front surface 9b of the disk is called "side-1". Magnetic head assemblies 10a and 10b constitute head chips on the side-0 and side-1 sides. A projected portion 11 for connection with an unload mechanism 12 is formed on the magnetic head assembly 9b. A head arm 13 for mounting the magnetic head assemblies has a projected portion 14 formed at the end portion thereof. Further, the head portions are supported by a carriage 16 which is mounted to be moved in a preset direction with respect to a head positioner 15 for driving and controlling the head portions. Further, a read/write amplifier 17 for recording and reproduction is mounted on the carriage 16.

In a case where a cartridge is not inserted into the disk device, the magnetic head assembly 9b on the side-1 side is pulled upwardly via the projected portion 11 formed on the magnetic head assembly 9b by a portion 12 of the head unload mechanism connected to a loading mechanism (not shown). On the other hand, the magnetic head assembly 9a on the side-0 side partially abuts against the projected portion 14 formed on the head arm 13 as will be described later so that the surface of an ABS (air bearing slider) formed on the head chip 10a may be set slightly nearer to the side-1 side than the disk surface. Further, the carriage 16 is pressed towards the exterior by means of the loading mechanism so that the magnetic head assembly 9 may be set on the outermost peripheral side of the disk. When the cartridge 2 is loaded into the disk device, the cartridge 2 is dropped from the top to the bottom of the spindle shaft 6. At this time, a cartridge shutter (not shown) formed on the the cartridge 2 is opened so as to open a window for permitting the magnetic head to be loaded. At the same time, the magnetic head assembly 9b is slowly lowered and set on the disk surface by means of the head unload mechanism 12. When the spindle motor 5 is rotated, the chucking hub 4 is attracted by the magnet of the hub base 7 and the chucking or fixing operation for the disk is completed. The disk 1 has servo information created for tracking operation as will be described later. A signal read by the magnetic head is amplified by the read/write amplifier 17 and then supplied to a positioning signal reproducing circuit 18 and a data readout circuit 19. The positioning signal is converted by an A/D converter 20 and then received by an MPU 21. After a necessary operation is effected in the MPU, a control signal is converted by a D/A converter 22 and then supplied to the positioner 15 via a current amplifier 23. As a result, the positioner 15 may permit the magnetic head to follow a target track. Data read out under the tracking control is supplied to a host system (not shown) via a controller 25. A target track address and data to be written are supplied from the host system to the controller 25, and after the seek operation by the MPU 21, the above data is supplied to the read/write amplifier 17 via the data recording circuit 24 and then written into the target track on the disk surface.

As explained in "Description of the Related Art", the rotation speed of the FDD is approx. 300 rpm and is low. If the rotation speed is forcedly increased, the durability of the recording medium may be influenced. In the case of a removable HDD, the rotation speed thereof is 3600 rpm and is high. However, a problem caused by dust occurs and the reliability thereof is low. Further, since the flying height (i.e. distance (height) of a flying gap) cannot be reduced, it is difficult to enhance the recording density.

Therefore, in this invention, a flexible disk held between the liners and a magnetic head of IBM3370 type constituting a basic structure are used to construct a removable disk device. This invention is described below with reference to the experimental results.

The experiment was effected with the recording density of 42 kFCI by using a 3.5-inch Ba-ferrite floppy disk (e.g. base thickness of 75 μm) and a thin film magnetic head (e.g. a microslider with the head load of 6.5 g is used). The disk is inserted into an ordinary disk cartridge and held between liners. Further, in order to enhance the dust removing effect, a lifter is kept pressed. A head exclusively used for the front surface of the disk is provided on the side-0 surface, the gap thereof is set in a position corresponding to the radius of 23.5 mm, a head exclusively used for the rear surface of the disk is provided on the side-1 surface, and the gap thereof is set in a position separated from the gap position of the side-1 towards the outermost periphery by approx. 1.5 mm.

Figure 2A:
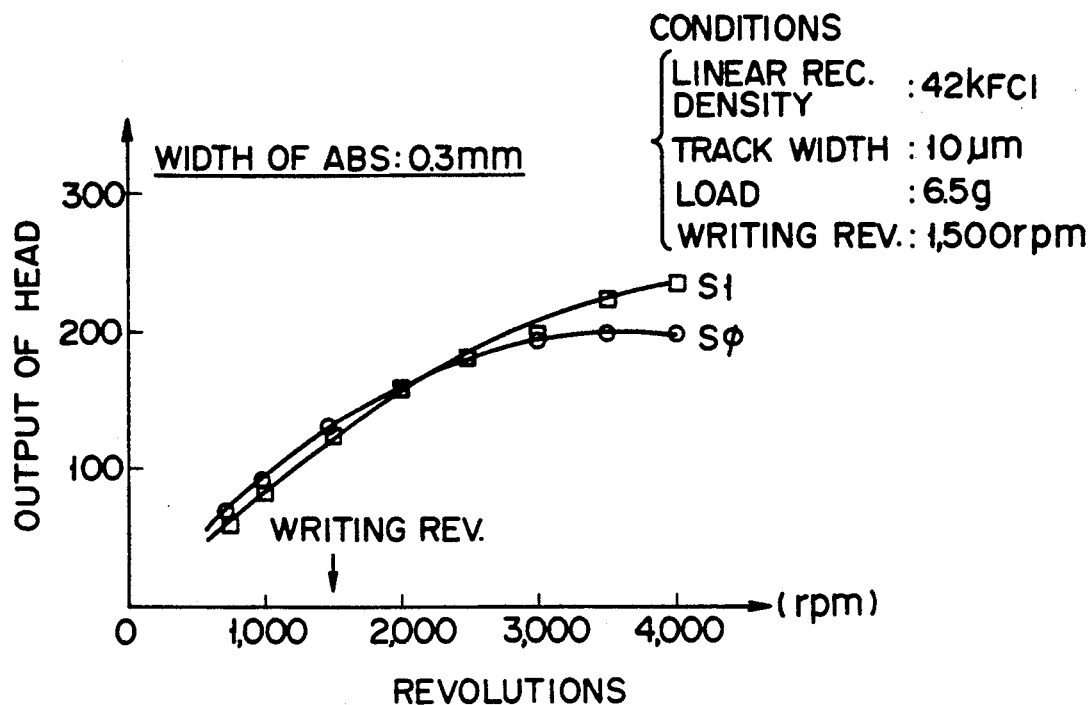
Figure 2B:
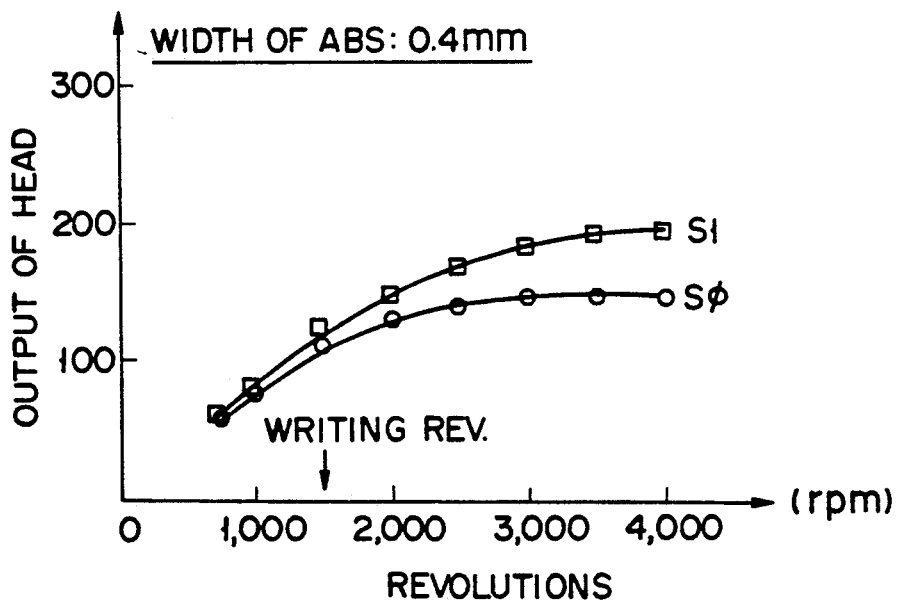

FIG. 2A is a graph showing the relation between the rotation speed and the head output in a case where the ABS width is set at 0.3 mm and FIG. 2B is a graph showing the relation between the rotation speed and the head output in a case where the ABS width is set at 0.4 mm. As is clearly seen from the drawing, a graph curve indicating that the head output linearly varies until the rotation speed reaches approx. 2000 rpm can be obtained in a case where the ABS width is set at 0.3 mm. That is, the rotation speed for reduction of 1 dB in the output is approx. 2600 rpm. In contrast, the head output linearly varies until the rotation speed reaches approx. 1700 rpm in a case where the ABS width is set at 0.4 mm. That is, the rotation speed for reduction of 1 dB in the output is approx. 2000 rpm. As described above, it is understood from the experiment that it becomes more difficult to float the head as the ABS width is set to be smaller if the head load is kept constant. The reason why the characteristic thereof becomes different on the side-0 and side-1 sides seems to be that the gravitational force is positively applied on the side-1 side and negatively applied on the side-0 side so that it may be more difficult for the head on the side-1 side to float.

Figure 3:
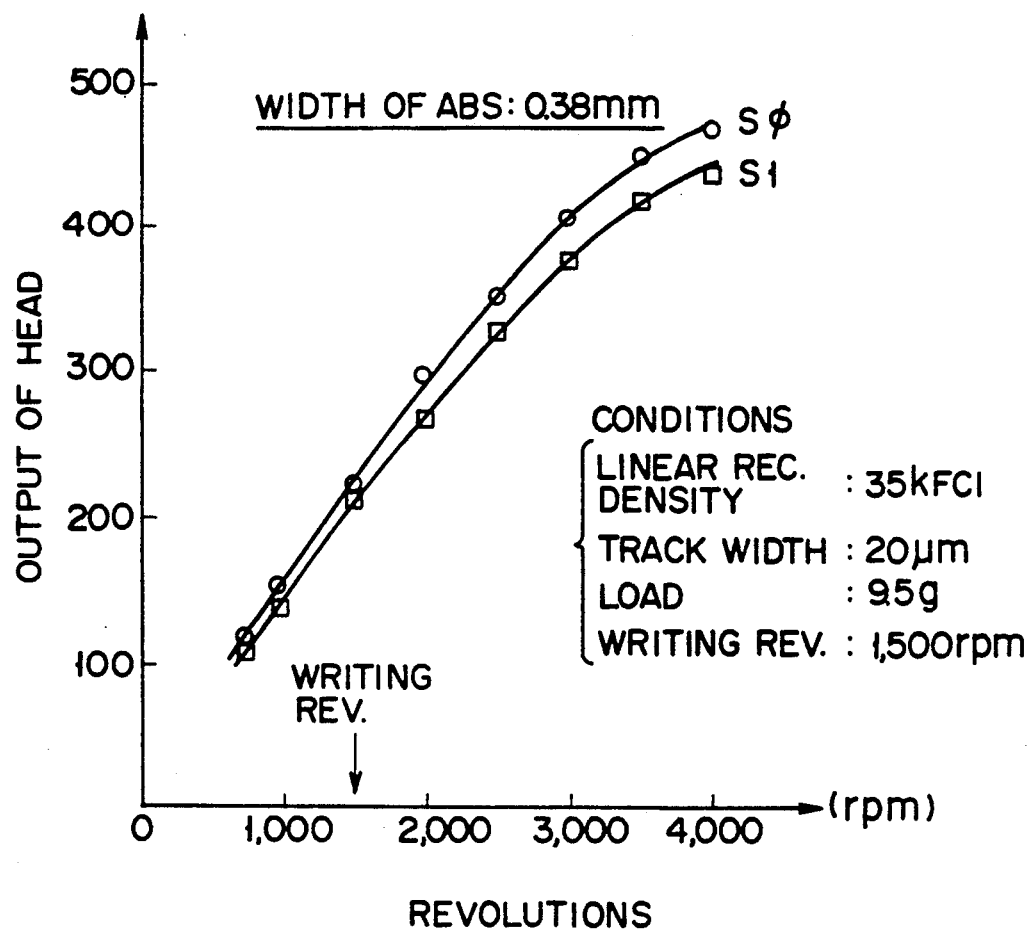

A graph of FIG. 3 indicates the experimental result for a normal slider type composite head with a head load of 9.5 g. The condition is that the ABS width is set at 0.38 mm and the recording density is set at 35 kFCI. The output linearly increases until 2300 rpm is reached and the rotation speed for reduction of 1 dB in the output is approx. 3000 rpm. The load is larger than in the cases of the graphs of FIGS. 2A and 2B and variation in the characteristic on the side-0 and side-1 sides is suppressed. Thus, it is understood that variation in the floating characteristic caused by the arrangement of the device can be reduced when the head load is increased to some extent. The recording/reproduction characteristic is good until the head output linearly increases, but modulation occurs when the head output becomes lower. This is considered to be because the recording ability of the head is lowered and cannot effect the uniform magnetization when the head starts to float and the ABS cannot sufficiently depress the medium so that a spacing between the head and the disk may be changed.

The spacing loss due to the floating is said to be $-54.6\, d/\lambda$ (dB). When the recording density is set at 42 kFCI ($\lambda = 1.21\, \mu m$), the floating distance corresponding to the spacing loss of 1 dB is approx. 0.02 μm, and when the recording density is set at 35 kFCI, the corresponding floating distance is approx. 0.024 μm. The mean surface irregularity Ra of the flexible disk is 0.008 μm and a large number of abnormal projections exceeding 0.02 μm can be observed. Therefore, the above floating distance may be said to correspond to a state in which the head is substantially set in contact with the disk. Actually, when the contact state between the head and the disk is measured by use of an AE sensor, a floating condition of the head cannot be obtained and a signal indicating that the head is set in contact with the disk surface is always derived in the range of rotation speed of 750 rpm to 4000 rpm. Thus, the above head system is used in a condition that part of the ABS is always set in contact with the disk unlike the case wherein the head of the HDD is completely set apart from the disk.

Graphic curves of FIGS. 4A and 4B indicate the experimental results obtained when the thin film head described before is used, the rotation speed is fixed at 1500 rpm and the mounting position of the head is changed. FIG. 4A shows a case wherein the ABS width is set at 0.3 mm and FIG. 4B shows a case wherein the ABS width is set at 0.4 mm. In either case, the range of the mounting height corresponding to reduction of 1 dB in the output is ±0.5 mm.

Figure 5:
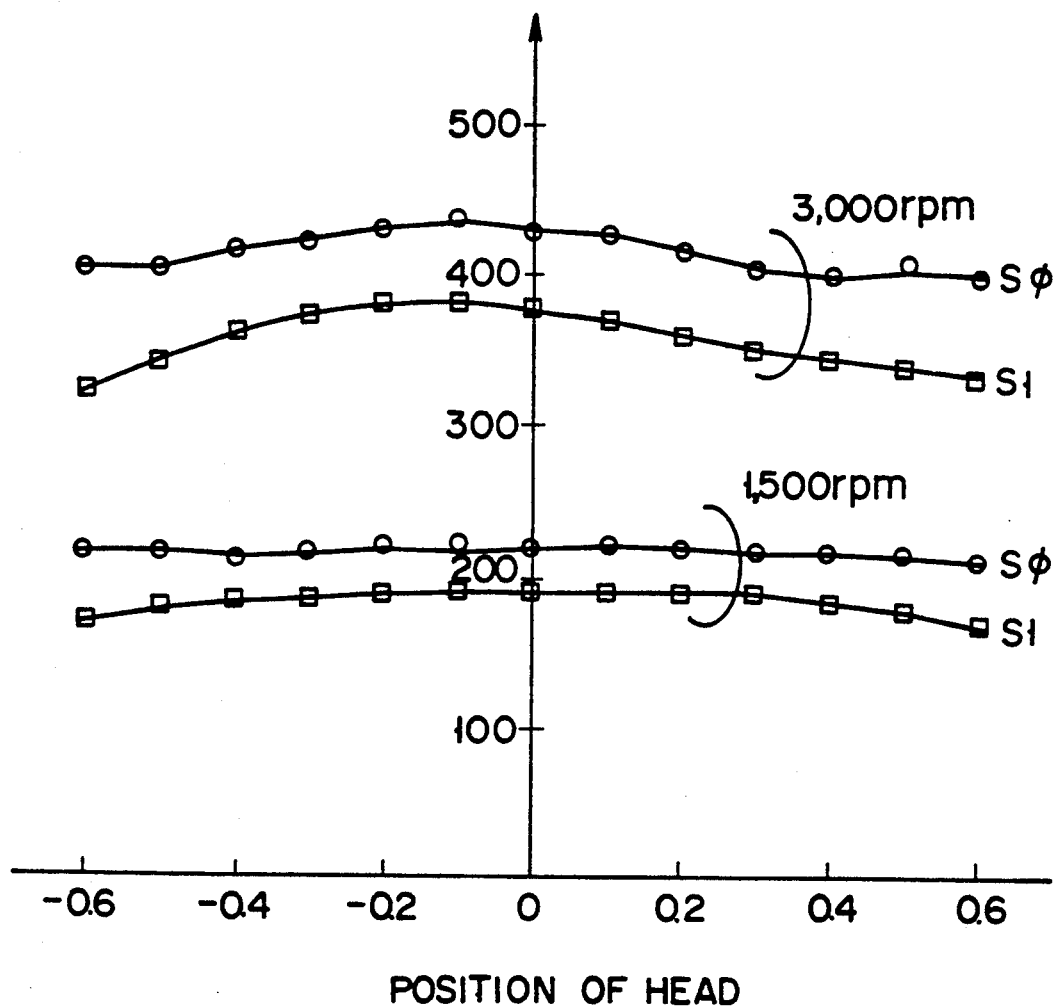

Likewise, FIG. 5 is a graph indicating the experimental result for the MIG (Metal In Gap) head. Also, in this type of head, a mounting margin of ±0.5 mm or more can be obtained when the rotation speed is set at 1500 rpm. Further, when the rotation speed is enhanced to 3000 rpm, the mounting margin is reduced to ±0.4 mm. In the case of FDD or HDD, the mounting margin of the head is said to be approx. ±0.2 mm. However, the experimental result of this invention indicates that a mounting margin more than twice the above value can be obtained. From the above experimental result, it is proved that the head/medium system of this embodiment has an excellent property from the viewpoint of head touch by use of an IBM3370 type magnetic head and a flexible disk having liners.

It is understood from the above experimental data that preferable head touch and mounting margin can be attained by setting part of the ABS in contact with the disk. In this case, the problem is the durability of the medium (i.e. FDD) in a case where the disk is rotated at a high speed while being set in contact with the head.

FIG. 6A is a graph indicating the head output and an output of the AE sensor obtained when an operation test of approx. 21,000,000 passes was effected for the conventional monolithic type head (e.g. normal type, head load is 15 g, ABS width is 0.58 mm, innermost periphery of the disk) for 26 days, 9 hours a day at a rotation speed of 1500 rpm. The graph indicates an output on the track which lies outside the position set for the operation test in the radial direction and which is not subjected to the operation test. The operation test was effected, for example, in an environment of an office under a condition that the cartridge was directly exposed to the interior of a room. However, even after the operation test of 21,000,000 passes, scars such as pass marks were not found. In this case, partial fall of the head output was observed, but this was because lubricant attached to the head partially remained on the disk at the start/stop operation time and dust was attached to this portion to make the head touch partially poor. However, the fall of the head output is not a problem from the viewpoint of a signal level. The above experiment was effected under an extremely severer condition than the operation test for the FDD and for an operation service life extremely longer than the operation service life of 3,000,000 passes (in a case of 300 rpm) which is required for the FDD. In the case of HDD, when the HDD is used with the head set in contact with the disk, pass marks are formed after 10,000 to 20,000 passes.

As described above, it is proved that the preferable mounting margin, excellent head touch and medium durability better than that of the conventional FDD can be obtained at a high rotation speed by holding the flexible disk between the liners, attaining the dust removing effect and preset flutter of the disk and using an IBM3370 type head with part of the ABS thereof set in contact with the disk. Further, since the head load set for a thin film head having a microslider is less than that for the monolithic type head used in the above experiment, the medium service life may be further extended.

In order to attain the stable medium driving operation, in the HDD thin film magnetic head with the microslider, a distance from the ABS surface to the pivot is set at approx. 0.75 mm with respect to the ABS distance (i.e. gap distance of 1.5 mm) and is thus set to substantially half the above gap distance. This is effected to prevent deterioration in the stability against the rolling or rotation in the radial direction at the time of seek operation when the distance to the pivot is set long with respect to the ABS distance. In the 3.5-inch floppy disk (not shown), the thickness of the cartridge is approx. 3.4 mm. Therefore, in order to permit the suspension arm to extend to the exterior from the cartridge case, it is necessary to set a distance from the ABS surface to the lower end of the suspension arm to approx. 3 mm like the case of the FDD. If the same concept as in the conventional case is applied, the ABS distance is set as long as 6 mm or more and it cannot be actually set inside the cartridge window. When a flexible disk is used, severer stability against the rolling than in the case of the HDD is required. Therefore, if the above concept is used, the slider becomes larger and it is not practical.

Therefore, in this invention, a distance from the ABS to the pivot is set as short as possible to enhance the rolling stability of the head.

Figure 7A:
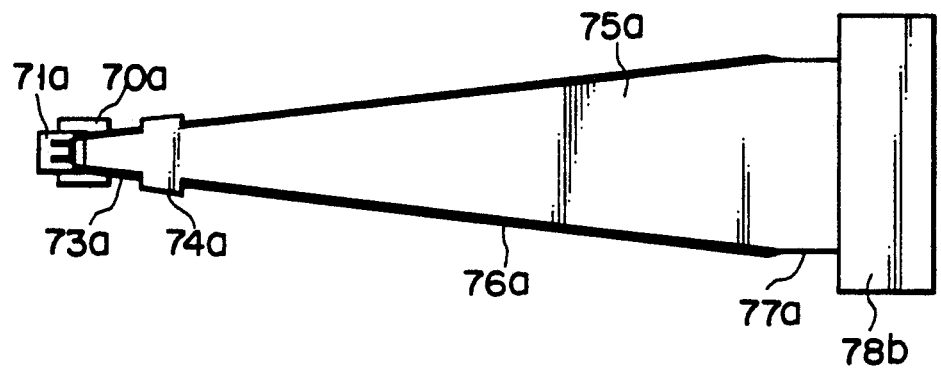
Figure 7B:
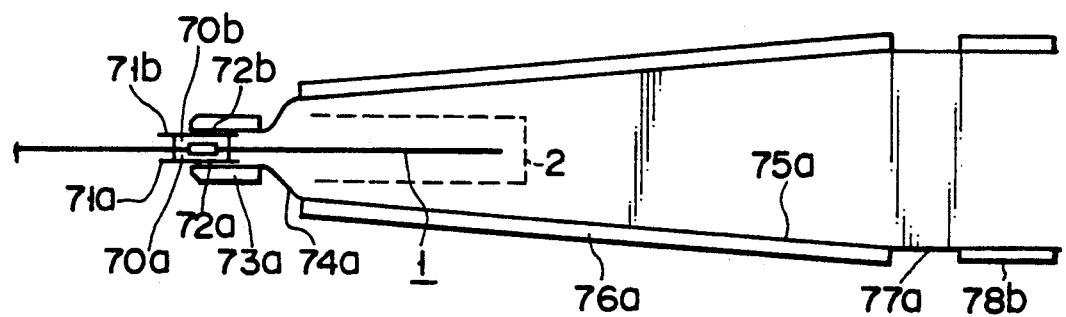

FIGS. 7A and 7B show a double-sided head system suspension as an example of the embodiment. A bent portion 74a is formed near the front end of the suspension in the conventional HDD magnetic head in order to prevent a suspension 75a from being set in contact with the cartridge 2. The length of the bent portion is determined according to the thickness of the cartridge and is set to approx. 2.3 mm in the case of use of the thin film head and 3.5-inch. The width of 74a is set large in FIG. 7A to leave a portion corresponding to the rise of the suspension, but the width may be properly set according to the required rgidity of the corresponding portion.

Figures 8A, 8B:
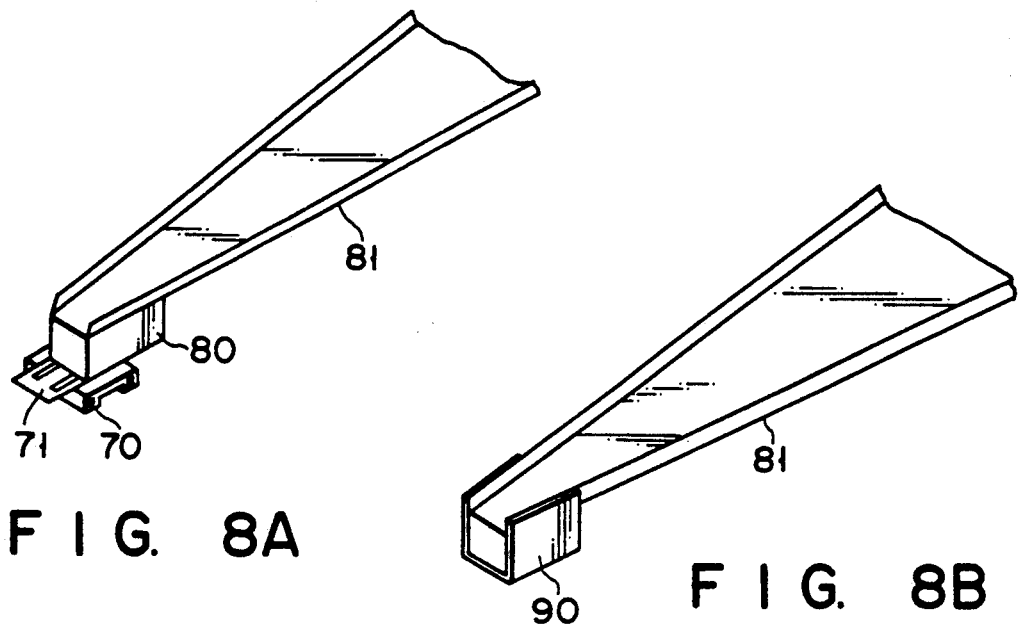

FIGS. 8A and 8B show another embodiment of this invention. In this embodiment, a block 80 is used as an offset means. Resin or ceramics which is rigid and lightweight may be preferably used as the material for the block.

Figure 9A:
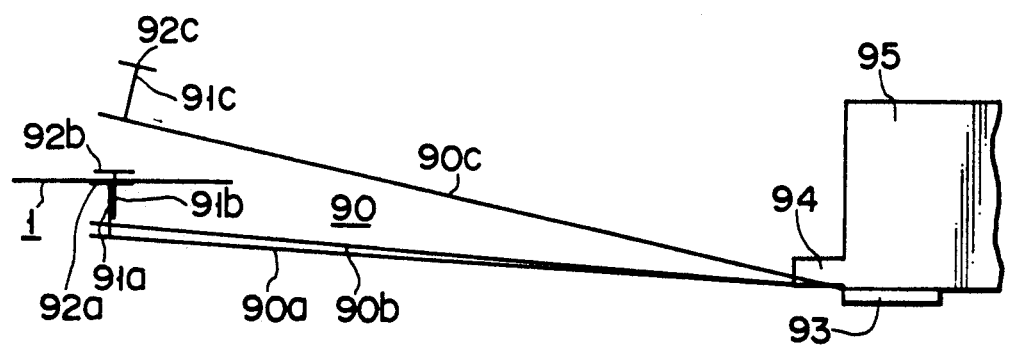
FIGS. 9A to 11 are perspective views showing embodiments of means for replacing disks of the double-sided head system.
Figure 9B:
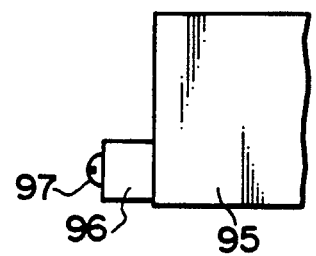

FIGS. 9A and 9B show still another embodiment of this invention. In this embodiment, an offset means is formed by using the same material as a suspension 81 which is generally a stainless steel plate and bending the same. Thus, the offset means can be formed in various configurations, but the head suspension can be prevented from abutting against the cartridge without influencing the rolling characteristic of the head by providing the offset for the suspension while the distance from the ABS surface to the pivot is kept short.

As shown in the embodiment of FIG. 1, the disk drive of this invention has a feature that a disk can be freely replaced. In this case, it is necessary to unload the magnetic head at the time of disk replacement. Since the head on the side-0 side is fixed in the conventional FDD, only the head on the side-1 side is lifted in connection with the disk removing mechanism when the disk is removed. When a disk is inserted, the head on the side-1 side is loaded at the same time as the chucking or with a short delay time by use of an air damper or the like. However, when the HDD (i.e. High Density Disk) head structure is basically used as in this invention, the above method cannot be used. That is, in this invention, since both of the heads on the side-0 and side-1 sides follow the "surface deflection" of the disk, preferable head touch can be stably attained in a range from the low speed to the high speed. Further, the mounting margin larger than that of the conventional FDD can be attained and a sufficiently long medium durability can be attained.

An embodiment in which a disk can be replaced by using an HDD magnetic head is a removable HDD. The removable HDD must be designed to have a dust protection structure so that dusts can be prevented from entering the cartridge. When no cartridge is used, the magnetic heads on the side-0 and side-1 sides are equally extended. When the disk is inserted and the chucking is completed, the disk is first rotated, the internal portion of the HDA (i.e. head disk assembly) is cleaned by a fan driven in connection with the disk rotation system and then the disk rotation is stopped. Next, the head is set onto the disk surface by means of a solenoid or stepping motor at such a slow speed as to prevent the disk from being damaged. After this, the head loading operation is effected and then the disk is rotated again. With the above method, since the heads on the side-0 and side-1 sides are equally extended, a large space for head unload is necessary and it is difficult to make the drive thin unlike the FDD. Further, a driving for head load becomes necessary. Therefore, the above method cannot be effected with a simple structure as in the case of the FDD. In this invention, even if the HDD magnetic head is used, the head load/unload can be attained with a structure which is as simple as that of the FDD.

FIGS. 9A and 9B show a head portion on the side-0 side. The head portion of FIG. 9A is constructed by a suspension 90, offset means 91, ABS surface 92, head mounting plate 93 and head arm 95. The head portion is driven to trace the following positions. That is, a suspension 90c indicates the state of the suspension in a case where a projection 94 for suspension stopper is not provided. Thus, in a case where the head on the side-1 side is not provided, a head ABS surface 92c is set at a relatively high position in comparison with the position in which the disk 1 should be set. That is, with the above bending operation, a preset head load is applied when the ABS surface coincides with the disk surface. In this invention, the projection 94 is provided so that the ABS surface may be set on the side-1 side in comparison with the ideal position of the disk. This amount is determined by taking the head mounting error and disk surface deflection into consideration and considering that the head edge will not damage the medium at the time of disk insertion and is preferably set to approx. 0.5 mm.

The head portion of FIG. 9B is so constructed that the projection 94 is separated from the head arm indicated by 96 and is fixed by use of a screw 97 in order to correctly effect the positioning. The reason why the ABS surface on the side-0 side can be set towards the side-1 side from the ideal position of the disk is that the disk is flexible.

Figure 10:
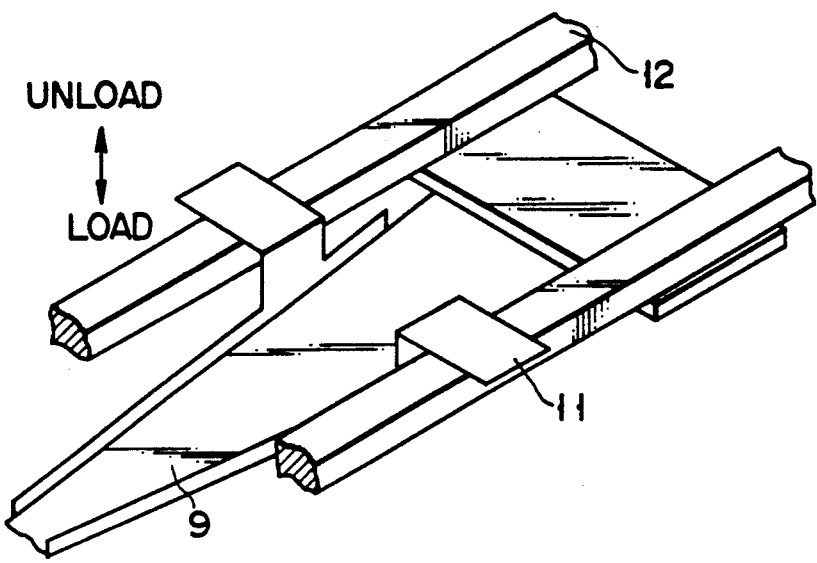

FIG. 10 shows a head unload mechanism on the side-1 side. A projection 11 for unload is formed on the head suspension and is interlinked with a loading mechanism by means of an unload plate 12 so as to permit the loading/unloading of the head.

Figure 11:
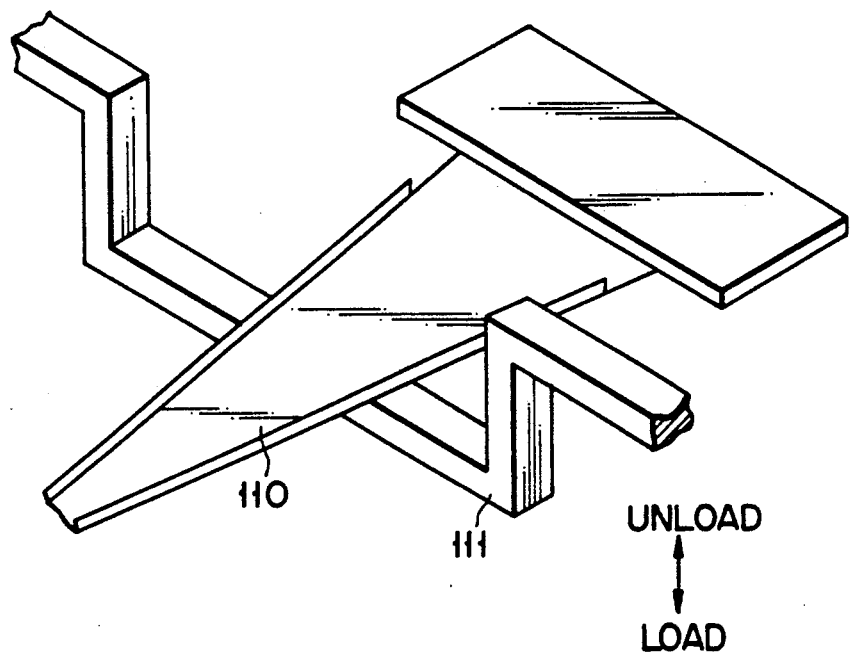

FIG. 11 shows another embodiment relating to a head portion. A suspension 110 has no projection for the head unloading. Instead of this, an unloading means with a structure indicated by 111 is used to vertically move the suspension 110 to effect the loading/unloading.

As described above, according to this invention, the head loading/unloading in the double-sided head system effected at the time of disk replacement can be attained by a mechanism which is as simple as that for the FDD. In the embodiment of this invention, when the head on the side-0 side is unloaded, it is set to slightly enter the side-1 side, but it is also possible to move the position thereof towards the side-0 side by a small distance by interlocking it with the loading mechanism. That is, the ABS surface may be set to be separated from the disk surface by 0.5 mm to 1 mm by increasing the space for the unloading for the head on the side-0 side rather than that on the side-1 side by use of the mechanism shown in FIG. 10 or 11.

Figure 12A:
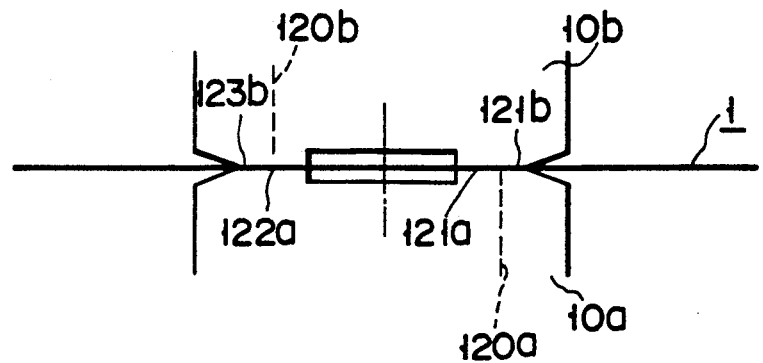
Figure 12B:
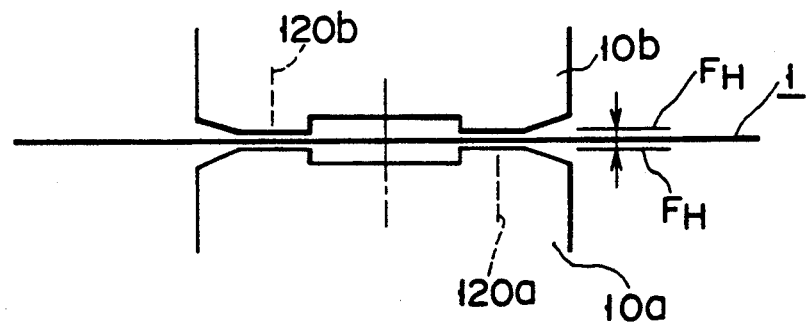

Next, the shape of the head slider is explained. FIGS. 12A and 12B show the relation between the disk and the head of the conventional symmetrical ABS surface. FIG. 12A shows a case wherein the peripheral speed of the disk is low and the ABS is set in contact with the disk 1. 120 indicates a position in which a head gap is formed. FIG. 12B shows a case wherein the peripheral speed of the disk is enhanced. That is, the head is floated from the disk by a distance of Fh. In the case of a flexible disk, the floating amount is determined in terms of the head output (e.g. gap position) and does not mean that the head is physically floated completely from the disk.

FIGS. 12A and 12B show the relation between the innermost periphery and the outermost periphery of the disk. That is, on the innermost peripheral side, the head is set in contact with the disk, but the head is slightly floated on the outermost peripheral side on which the peripheral speed is high. In the ordinary CAV recording, the recording density becomes lower for the recording position nearer to the outermost periphery so that the spacing loss due to the floating of the head can be neglected. However, in the ZBR recording (i.e. zone bit recording) used for increasing the capacity, the recording density becomes substantially equal in the inner peripheral portion and in the outer peripheral portion. Therefore, on the outer peripheral side on which the head is floated, the signal output will be lowered on the inner peripheral side. Further, it is not preferable that the floating amount varies according to the peripheral speed when the rotation speed of the disk is changed.

FIGS. 13A to 13C shows an embodiment for solving the problem associated with the prior art (refer to FIGS. 12A and 12B) described above. FIG. 13A shows a case wherein the disk is rotated at a low speed, FIG. 13B shows a case wherein the disk is rotated at a mid.

speed, and FIG. 13C shows a case wherein the disk is rotated at a high speed. In the double-sided head system, the width of the ABS surface lying on the side on which a head gap is provided is smaller than that of the ABS surface which faces the above ABS surface and lies on the side on which no head gap is provided. When the rotation speed of the disk is low, the disk and the ABS surface are set in contact with each other. When the rotation speed is increased, pressures 132 and 133 occur between the the wider ABS surfaces 130b, 131a and the disk surface as shown in FIG. 13B so that the disk will be pressed against the narrower ABS surfaces 130a, 131b. That is, a spacing Fh occurs between the disk surface and the ABS surface having no head gap and substantially no spacing occurs on the side on which the head gap is provided so that the disk surface and the ABS surface are kept set in contact with each other. When the rotation speed is further enhanced as shown in FIG. 13C, the air pressure on the wide ABS surface becomes higher, thereby further increasing the spacing on this surface side. However, since the disk surface and the ABS surface on the opposite side are pressed against with a high (i.e. sufficiently high) air pressure, substantially no spacing is created even when the rotation speed becomes high. When the ABS width is determined, the width of the narrower ABS surface is first determined according to the rotation speed of the disk, head load, friction coefficient, and medium durability and then the width of the wider ABS surface may be determined to be approx. twice the width of the narrower ABS surface. As the rotation speed becomes high or the peripheral speed of the disk becomes high, the disk is distorted as shown in FIG. 13C, but in the normal application, Fh is only 0.2 to 0.3 µm. The value can be neglected in comparison with the thickness of 7.5 µm of the medium and the gap distance of 1.5 mm. Further, it is preferable to form the head gaps 120a and 120b on the outer sides of the central positions of the respective ABS surfaces 130a and 131b, that is, on the sides opposite to the separation grooves of the respective ABSs. Thus, in this invention, if the ABS width is adequately set, the ABS surface having the head gap can be kept in contact with the disk irrespective of the peripheral speed of the disk. The method of this invention does not require that the head load is forcedly increased or the ABS width is reduced. Further, one of the ABSs is separated from the disk surface. This is significantly advantageous for the durability of the medium. Further, since the friction coefficient becomes small, the load torque of the spindle motor can be made small.

Next, a concrete track format of the disk is explained. This invention is a removable disk drive having a high density large capacity and high speed like the HDD. That is, the fundamental function thereof is as follows: the recording capacity set after one disk is formatted is more than 100 Mbytes, and the data transfer speed is 1.5 Mbytes/second. Further, the disk used is a 3.5-inch Ba ferrite floppy disk, the head is a thin film head, the track density is 2000 TPI, the line recording density is 70 to 75 kBPI, and the rotation speed of the disk is 1800 rpm. Unlike the conventional bulk head of the FDD, the thin film head can be formed to have the precise track width and ga length in the same manner as in the semiconductor process. Further, the values thereof are smaller by one digit in comparison with the bulk head even if the coil turns having the same inductance are used. Therefore, incomplete erasing of tracks or OWM noise (over-write noise) caused by a difference in the track width or gap length, or OWM caused by dull rising of the recording current will not make any problem. As a result, it is not necessary to use a first-erasing type head which is required in the high-density recording. Further, since a pre-amplifier of low noise can be used when the thin film head is used, it is not necessary to increase the system S/N even when the signal level is lowered by making the tracks narrower. Therefore, it is possible to select the high-density recording medium with much attention paid to the medium S/N and resolution rather than to the output.

When a floppy disk is used, the tracing or following ability of the tracking servo system with respect to the secondary track deflection (maximum: ±10 µm) and the primary track deflection (maximum: ±10 µm) caused by anisotropic expansion and contraction of a medium due to the temperature and moisture and the eccentricity caused by the disk replacement becomes an important factor for determining the track density. If the track density is 2000 TPI, it is required to set the track width to approx. 10 µm and set the positioning precision to approx. ±0.6 µm. An actual positioning error includes a random component in addition to the above primary and secondary components. Further, it is required to be highly resistant to vibration and mechanical shock applied to the drive from the exterior.

With an HDD having the track density of approx. 2000 TPI, a servo bandwidth of approx. 400 Hz is used. However, in this invention, since a flexible disk is used and a large secondary track deflection occurs, the servo bandwidth of 540 Hz which is determined by considering the following ability with respect to the "deflection" is used. At this time, the following errors with respect to the maximum values of the primary and secondary track deflections were measured to be ±0.08 µm and ±0.3 µm since the gains of 2 dB and 30 dB could be obtained. Thus, in the embodiment of this invention, it is understood that the performance suppressing the following errors less than the permissible values can be obtained. It is said that the sampling frequency of servo information must be set to approx. seven times the servo bandwidth. For this reason, in the conventional "sector servo system" in which servo information is created for each sector, it is impossible to obtain a sufficiently high sampling frequency. Therefore, in the embodiment of this invention, a "modified sector servo system" in which servo information is also created in the data sector is used.

Figure 14:
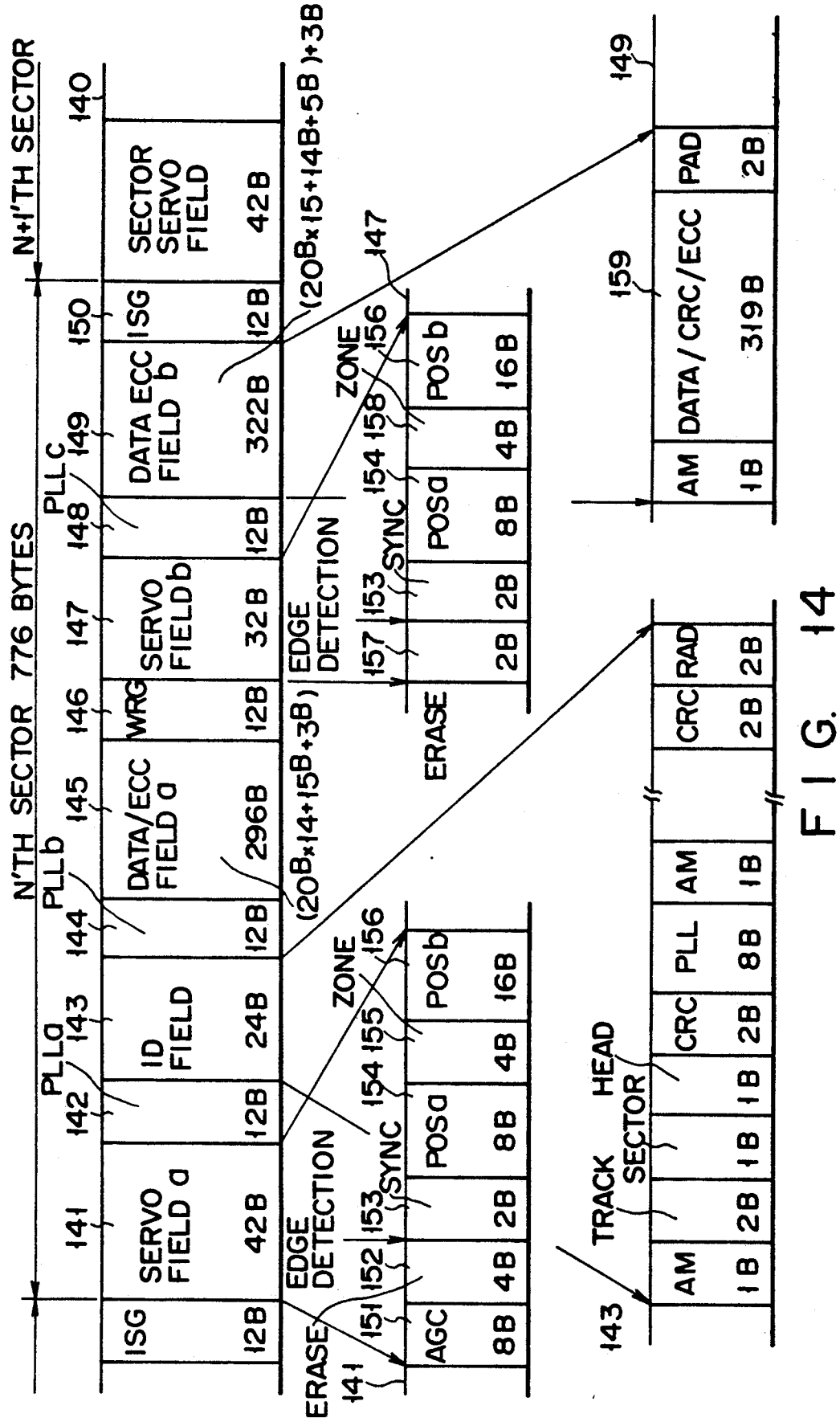
FIG. 14 is a field diagram showing one embodiment of a track format of the disk.

FIG. 14 shows an example 140 of a disk format of this invention. The unformat capacity for each sector is 776 bytes and the format capacity is 512 bytes. Each sector is constructed as follows. That is, it is constructed by servo field a 141, PLL a 142 (PLL signal for modulation of an ID field), ID field 143, PLL b 144 (PLL signal for modulation of a data/ECC field a), data/ECC field a 145, WRG (write recovery gap) 146, servo field b 147, PLL c 148 (signal for modulation of a data/ECC b field), data/ECC field b 149, and ISG (inter sector gap) 150. Each sector is divided into two sections according to the servo information and the lengths thereof are each set to 388 bytes starting from the edge detection positions indicated by 141 and 147. The servo field a 141 is constructed by an AGC 151, ERASE 152, SYNC 153, POS a 154, ZONE 155 and POS b 156. The servo field b is constructed by an ERASE 157, SYNC 153, POS a 154, ZONE 158 and POS b 156. The ERASE 152 is a field for detecting the servo field b and constructed by a 2-byte DC erase. The sector mark can be detected based on the length of the ERASE section, but in order to enhance the reliability, an identification signal is provided in the ZONE section.

Figure 15:
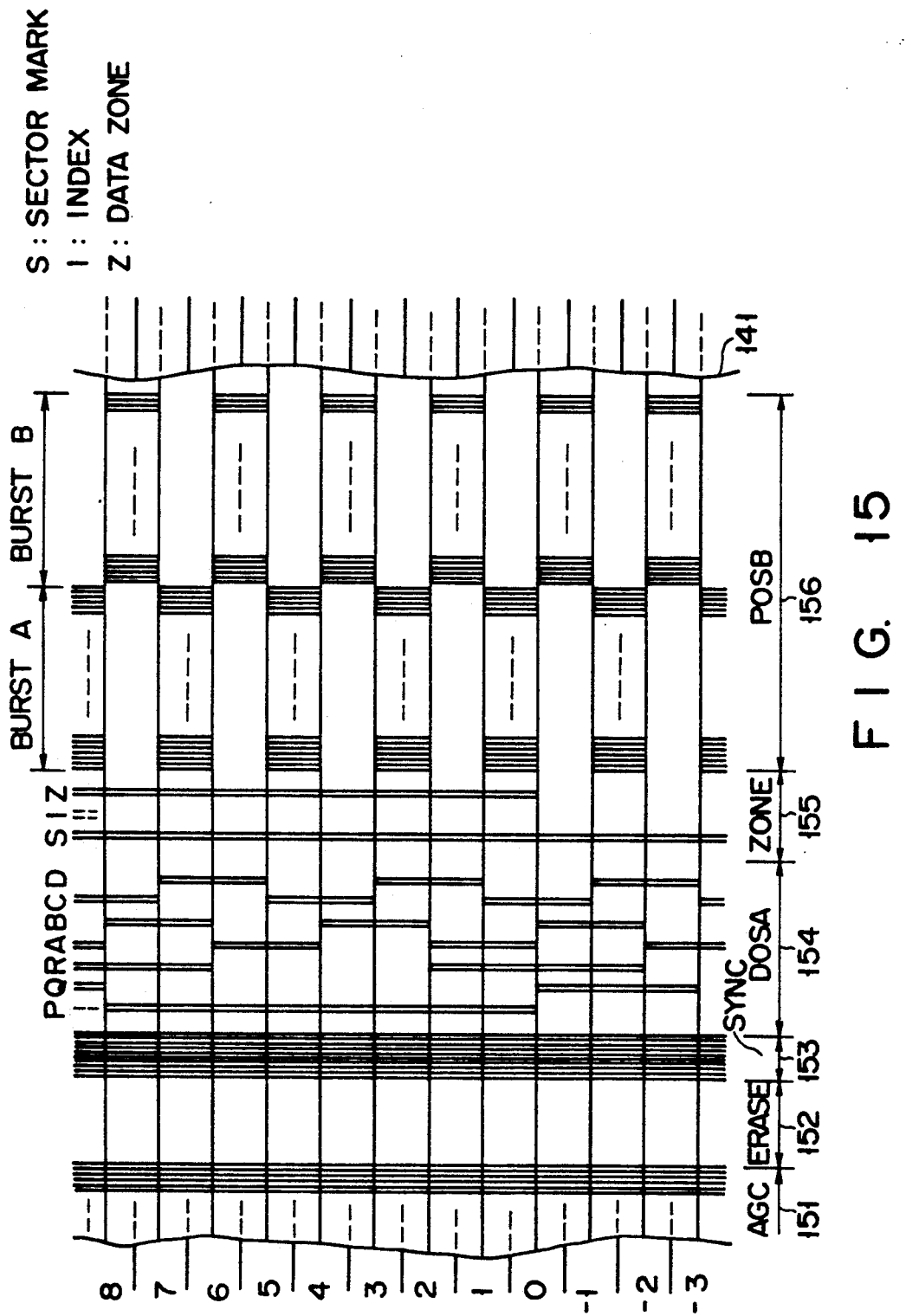
FIG. 15 is a a pattern diagram showing one embodiment of a servo pattern.

FIG. 15 shows the servo field in detail. The ZONE section is constructed by a sector signal, index signal and data zone signal. The sector signal is set to be at an "H" level in the ZONE 155 and at an "L" level in the ZONE 157. The sector mark can be correctly detected based on the above signals. Position bits used for speed control and periodic signals P, Q, R, A, B, C and D are formed in the POS a. The way of using the above signals is described in detail in U.S. Pat. No. 4,631,606 and therefore it is not explained here. Use of the above signals permits a speed up to a 16 track/sample speed to be directly detected, and if the periodicity thereof is used, a speed up to a 32 track/sample speed which is twice the above value can be detected with a permissible speed error. In this embodiment, since the track density is 200 TPI, the detection speed is 0.78 m/s for the 16 track/sample. The speed is a detection speed which make it possible to attain an average seek time of approx. 25 ms.

In FIG. 1 showing one embodiment of this invention, it is not constructed to use an optical scale or the like in the outside position, but it is possible to use a position detection means such as an optical scale in addition to the disk servo information from the viewpoint of stiffness against disturbance, high-speed seek, format efficiency, and the like. The POS b is a burst-like position signal and is used for position following control. The reason why the burst-like signal is used is to enhance the S/N ratio of the position signal which is lowered when the track density is set high by increasing the number of position bits.

As described before, the double-sided head system of this invention includes a symmetrical head suspension and is constructed to follow a large surface deflection of the disk and distortion of the disk caused by the arrangement of the disk. Therefore, even if the track distances of both of the heads are precisely aligned with each other in the assembling process of the device, they are deviated from each other at the time of actual application. Further, the expansion and contraction of the track width due to the temperature and moisture become extremely large. With the device of the embodiment of this invention in which the track density is 200 TPI, the amount of track deviation between the two heads may be considered to correspond to a plurality of tracks. Therefore, if the amount of track deviation between the two heads arise, it becomes necessary to effect the RTZ (return-to-zero, i.e. initialization of the track number) each time the head is changed, thereby making the access time longer. However, in the embodiment of this invention, a plurality of position signals having a 16-track period as a maximum value are used as shown in FIG. 15. Therefore, if the position deviation is less than ±8 tracks, the position deviation can be automatically corrected by use of the above position signals when the head is changed. Further, if the track deviation exceeds the above range, position bits may be added to the POS a of 154 according to the amount of expected "deviation". Another method is to seek a desired position, for example, a portion near the center of the disk after the disk is inserted into the device, change the head and then read the track addresses on the respective surfaces. Then, the track deviation amount is derived from a difference between the read track addresses and may be used as a track offset in the succeeding seeking operation. Further, in the case of a disk which is not formatted, it is formatted for each side and then the same correction method is effected. However, even if the track deviation is corrected by use of the above method, a difference in the partial track deviation may be still caused by the distortion of the disk and the expansion and contraction of the disk due to the temperature and moisture. This amount corresponds to only several tracks and will not become any problem when a periodic servo pattern having a long period of 16 tracks is used as in this invention.

In the embodiment of this invention, the high-density recording can be effected with the density which is as high as 60 times that of the conventional 2HD floppy disk. Therefore, defects of the medium or degradation in the signal S/N will become a problem. For this reason, the ID field 143 utilizes the overwriting of ID and is used together with a detection signal of the servo sector to ensure the ID detection. Further, the data field uses the error correction method which is highly effective like the optical disk. In an optical disk which is now actually produced, a 5-interleave "Read Solomon Code" is used when it is formed with 512 byte format. However, in the embodiment of this invention, since a recording medium in which the track width is as large as 8 times that of the optical disk is used, it is expected that the possibility of occurrence of defects is relatively small. Therefore, in this embodiment, a 4-interleave read solomon code is used.

Figure 16:
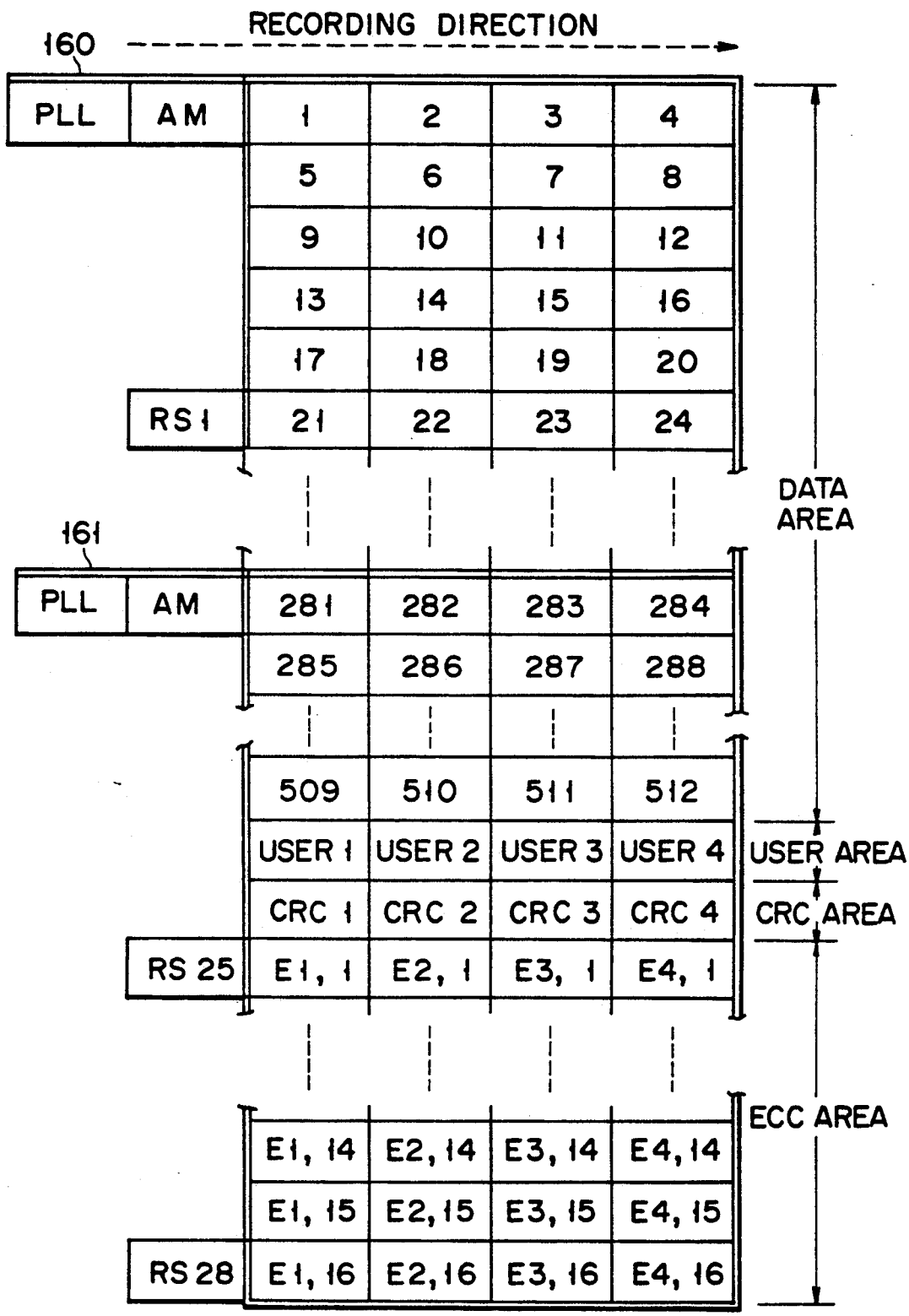
FIG. 16 is a diagram of the arrangement of data showing one embodiment of a data/ECC (Error Correcting Code) field in the track format.

FIG. 16 shows an example of the arrangement of data. A reference numeral 160 denotes data recorded in the data/ECC field 145 and a reference numeral 161 denotes data recorded in the data/ECC field 149. A re-sink pattern RS is provided in the unit of 20 bytes and used to prevent an error from being transmitted by occurrence of a defect. A USER area is provided so that a user may store control data or the like in addition to data.

Figure 17:
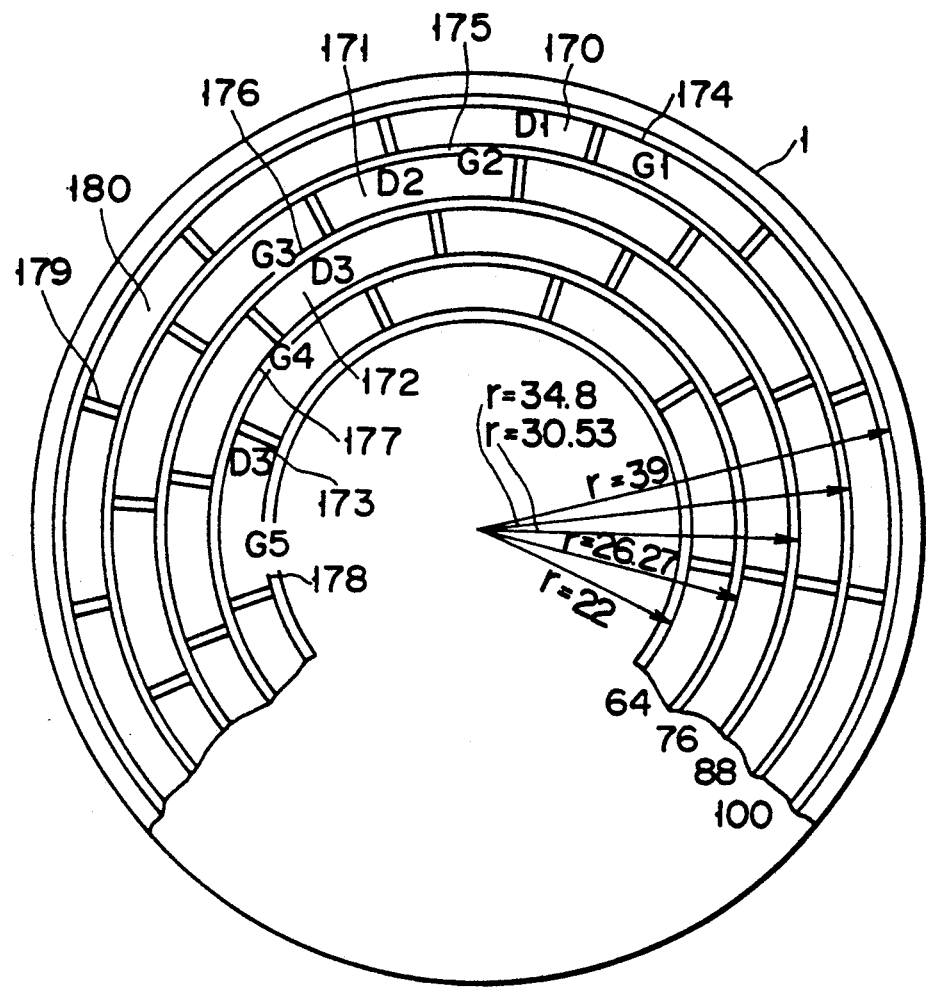
FIG. 17 is a diagram showing a recording sector area of the disk using a Zone Bit Recording recording system.

FIG. 17 shows the positional relation of zones (i.e. tracks/sectors) on the disk surface when the ZBR recording system is used. The head section of this invention uses a thin film head of microslider, and therefore the radius of the innermost periphery of the disk used as a recording medium is 22 mm on the side "1" and 23 mm on the side "0", the stroke is 17 mm, and the number of tracks is 1338. The unformat capacity set when the ZBR recording system is not used is 132.9 Mbytes and the capacity after the formatting is 87.68 Mbytes and is less than 199 Mbytes. Therefore, as shown in FIG. 17, in the disk of this invention, the data track area is divided into four sections. D1 of 170, D2 of 171. D3 of 172 and D4 of 173 indicate effective data zones. In each data zone, the number of tracks is 330 and the numbers of sectors are sequentially set to 64, 76, 88 and 100 for the four tracks starting from the innermost periphery. Therefore, the format capacity of 110 Mbytes can be attained and thus the target capacity of this invention or 100 Mbytes can be attained. Therefore, the rate of an increase in the format capacity caused by using the 4-division ZBR recording system is approx. 25%. The format capacity can be increased by increasing the number of divisions. However, since the rate of increase in the capacity is small although the circuit becomes rather complicated, the upper limit of the number of divisions is approx. 10.

G1 of 174 and G5 of 178 indicate outer guard zones, and G2 of 175, G3 of 176 and G4 of 177 indicate inner guard zones. The inner guard zones are provided to permit the ZBR recording system and "modified sector servo system" to be used in combination and 6 tracks are assigned for each of them. Since provision of the zones may cause a margin for the clock changing time between adjacent zones at the seeking time, servo information can be correctly received at a high speed even at the seeking time. However, if a position detecting means such as an optical scale other than the disk is provided, the zone is not necessary.

An example of the sector servo system has been explained in the above embodiment of this invention, but this invention is also applied to a deep-recording servo system (buried servo system). In this case, a servo gap is formed in one of double-barrel sliders in addition to the data R/W gap. Further, in this invention, a removable type device in which a disk can be replaced has been explained, but this invention can also be applied to a device in which a disk cannot be replaced.

Further, this invention can be applied not only to a magnetic recording system but also to an optical disk using a flexible disk. However, in a case of an optical disk using an objective lens, a permissible focusing error is as large as ±1 μm. Therefore, when the head slider/-suspension is designed, it may be constructed so as to set the focus error at the outermost periphery within the permissible focus error. According to the technical scope of this invention, a focusing structure is not necessary and therefore the optical pick-up can be easily constructed.

FIG. 18 shows an example of an optical pick-up which is constructed as a modification of this invention by directly mounting a semiconductor laser chip 181 on a head chip 180. It is possible to read a signal without using an optical detector by using the signal detecting ability of the semiconductor laser itself. Further, if the thin film process is used, it is possible to collectively form the semiconductor laser, optical detector, optical systems for picking up various signals on the head chip. Therefore, this invention can also be applied to an MO (Magneto-Optical) or PC (Phase Chanel) recording medium. Further, in the case of an optical disk, since the floating amount can be increased at the time of application, a simple pick-up system can be constructed by setting a disk of CD into a cartridge with liners and arranging the above optical pick-up to read the disk, for example, and at the same time, the optical disk can be easily formed in a double-sided configuration.

Thus, this invention can be applied to the magnetic disk and optical disk and can be variously modified without departing from the technical scope of this invention.

As described above with reference to the embodiments and modifications, according to this invention, the recording density which is higher than that of the fixed-type HDD and the access speed comparative to that of the HDD can be easily attained at a low cost by using a double-sided head system having a flexible disk HDD head held between the liners as a basic structure. Further, unlike the removable HDD, there is no possibility of head crash and the service life of the recording medium can be made longer than that of the general FDD.

Thus, according to this invention, a removable magnetic disk drive which has a high speed and large capacity like the HDD and which is inexpensive and can be easily handled like the FDD can be easily obtained, and the practicability and the effect thereof ar extremely high.

Figures 19A, 19B, 19C:
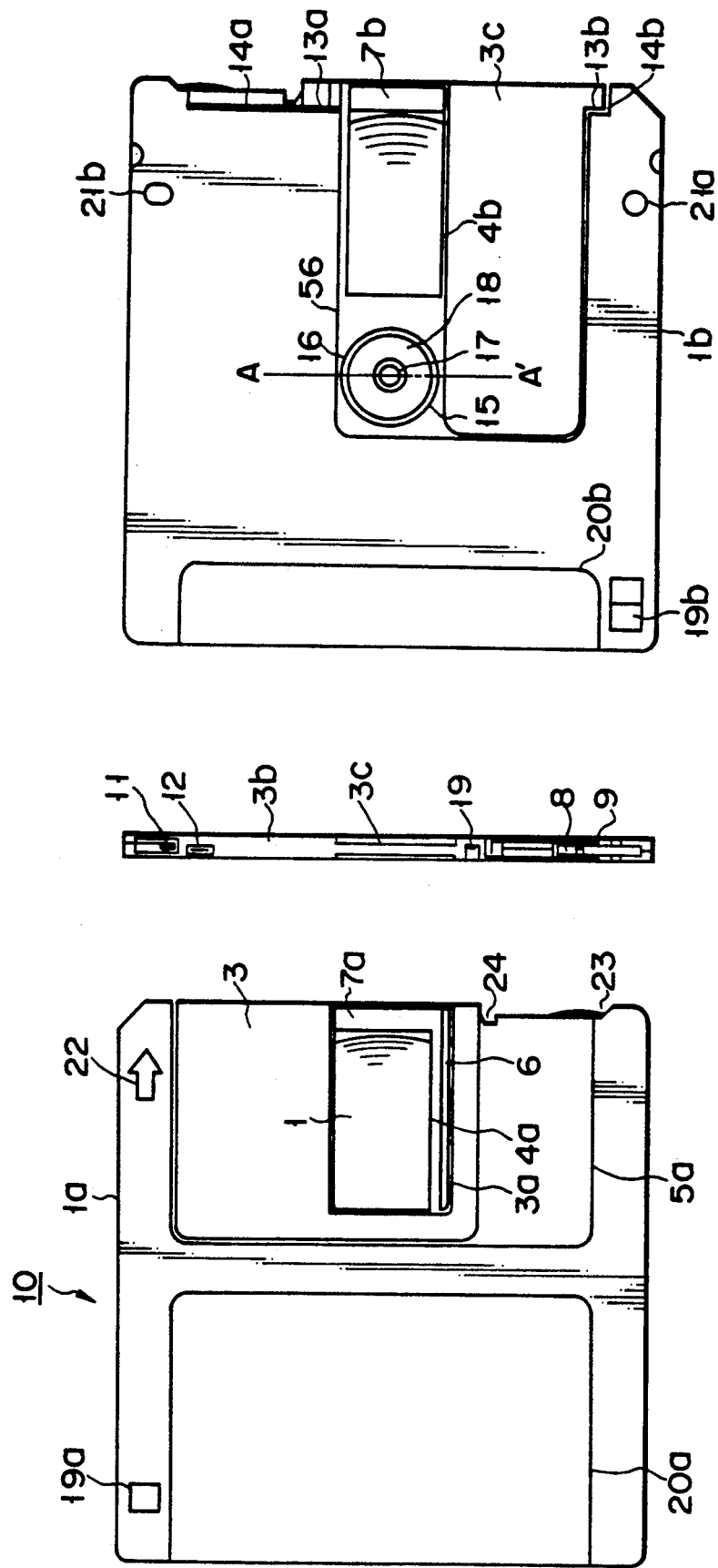
FIGS. 19A to 19C are three side views showing a disk cartridge according to one embodiment of this invention.

Now, the cartridge structure of a floppy disk (FD) provided as an embodiment of a recording medium of a system of this invention is explained. FIGS. 19A to 19C show the state in which a shutter is set in the open position, FIG. 19A is a plan view, FIG. 19B is a side view and FIG. 19C is a rear view. Shells 1a and 1b of the cartridge are formed of resin such as vinyl chloride and melted together a after floppy disk 2 is inserted into the cartridge. The floppy disk has a diameter of 94 mm and the size of the cartridge for receiving the floppy disk is 98 mm × 102 mm. As shown in the plan view, a shutter 3 has a window 3a for the magnetic head loading. The height (i.e. thickness) of the magnetic head can be made small even though the cartridge is thicker than the 3.5′ FD by cutting away part 3c of a side portion 3b.

Windows 4a and 4b used for loading the magnetic heads are formed with a width of 18 mm and can receive not only the magnetic head but also the whole portion of the magnetic head arm so that the drive can be made effectively thin. A window (i.e. opening) 15 for disk chucking has a diameter of 18 mm. Recesses 5a and 5b formed in the shells are formed such that the upper surface of the shutter will not exceed the highest surface of the shell, thereby permitting the shutter 3 to be moved. A projection 8 of the shell formed in the shutter window 3a is formed to prevent dust remaining in the recess 5a of the shell from being removed and put onto the disk surface by the portion 3a. Bridges 7a and 7b for mechanically strengthening the cartridge are formed with substantially the same thickness (e.g. 1.5 to 2 mm) as the shutter 3c.

Since a shutter lock mechanism 8 has a spring property, it enters the internal portion of the cartridge when it abuts against a shutter opening/closing pin (not shown). 9 is engaged with a projection 19 formed on the shutter 3 when the shutter 3 is set into the closing state and prevents the shutter 3 from being opened even when the shutter 3 is pulled. A spring 11 in the "letter-α" form is disposed on a projection 12 of the shutter 3 and between the projection and the internal wall of the cartridge and applies a spring force in a direction to close the shutter. Grooves 14a and 14b along which the shutter is slided are respectively engaged with 13a and 13b. In order to open the shutter 3, the shutter lock mechanism 8 is depressed at position 23 by means of the shutter opening/closing pin (not shown). In practice, when the cartridge 1 is inserted into the drive, the shutter opening/closing pin disposed in the drive depresses the shutter lock mechanism 8 at the position 23. As a result, the lock mechanism is released. After this, if the cartridge is further inserted, the shutter opening/closing pin depresses the shutter 3 against the spring force of the spring 11 and finally it is engaged with a groove 24 to set the shutter into the open state as shown in the drawing. When the shutter opening/closing pin is disengaged from the groove 24, the shutter 3 starts to be closed by a spring force of the spring 11 and the lock mechanism 8 is depressed to engage the projection 19 into the groove 9 so as to set the shutter into the locked state. At this time, the shutter 3 completely closes the windows 4a and 4b for loading the magnetic head and the window 15 for chucking so as to prevent entrance of dusts.

FIG. 20 illustrates the chucking operation of the disk and is a cross sectional view taken along the line A—A′ of FIG. 19C (in FIG. 20, a portion on the spindle shaft side is not shown). In the conventional 3.5" FD, the chucking system by use of a spindle shaft and a driving pin is used. When the conventional system is used, the window for the chucking hub becomes excessively large and it becomes difficult to completely close the window with the shutter. Further, a driving force cannot be derived if a load is not applied to the disk. Also, a small fluctuation may be caused in the peripheral direction by variation in the load.

In this embodiment, the chucking is effected by the engagement with the spindle shaft and the attraction force of the magnet on the assumption that the "tracking servo system" is used.

In this embodiment, a flange-like chucking hub 16 is formed of resin such as polycarbonate and is integrally formed with a hole for engagement with a spindle shaft 17 and a magnetic member 18 (25 indicates a member for attaining mechanical strength) for magnetic chucking. With this formation method, eccentricity of approx. 10 $\mu$m may occur between the hub and a spindle shaft 30, but the degree of eccentricity is smaller than the primary mode and secondary mode caused by anisotropic expansion and contraction of the disk due to the temperature and moisture, and the eccentricity is limited in a range which can be completely followed by the tracking servo and does not make any problem in application.

A chucking cup 31 and a magnet 32 effect the chucking by attracting the magnetic member 18 (i.e. plated iron plate). At this time, the front end of the spindle shaft 30 abuts against a sliding plate 29 to slightly raise the upper surface of the cartridge shell so that the disk 2 may easily rotate. Fixation of the disk 2 on the hub is effected at the flange portion of the hub. The disk is held between liners 30a and 30b provided for dust removal and prevention of deflection of the disk. With the structure of this embodiment, since entrance of dust is more effectively suppressed in comparison with the 3.5" FD structure, it is not necessary to rigidly hold the disk by use of a lift, for example. Therefore, the load of the spindle can be made light-weight by a corresponding amount.

Further, a liner 28 provided between the cartridge shell and the flange 27 of the hub 16 prevents hangdown of the hub and permits the shutter to be smoothly opened or closed.

When the disk is separated from the spindle shaft 30, the whole portion of the cartridge 1 is raised. The hub and the cup are attached to each other by a magnet 32 and kept in contact with each other, and if it is further raised, the flange 27 of the hub strikes against the shell and released from the attraction force of the magnet 32. As a result, the hub and the cup are separated from each other and the disk is separated from the spindle shaft 30. Thus, even if the chucking is effected by use of the magnet having a strong attraction force, no load is applied to the attached portion of the disk and hub, thereby protecting the attached portion from being damaged.

In the above example, the hub is formed of resin but may be formed of a metal plate such as an iron plate.

Further, a cartridge smaller than that of this embodiment may be handled in the same manner.

19a and 19b indicate a write protecting hole and slide switch, 20a and 20b indicate recesses for label attachment, 21a and 21b indicate holes for positioning the cartridge and 22 indicates an arrow indicating the insertion direction of the cartridge.

Next, the high-density recording of the floppy disk and the disk format are explained.

When the recording time is set to 60 minutes by using the "storage audio coding system" (bit rate: 256 kbps) which is now internationally examined for standardization as a digital audio source for recording floppy disks, the memory capacity of 115.2 Mbytes of the floppy disk becomes necessary. If the logic format efficiency of the disk is 60%, the unformat (UF) capacity of 192 Mbytes can be obtained.

Assuming that the recording area of the floppy disk on the side-1 surface is set in the range of radius r=22 mm to 42 mm (i.e. r=23.5 to 43.5 mm on the side-0 surface), the line recording density is set to be 70 kbpi (i.e. the line recording density on the disk becomes 52.5 Kfci when a (1,7) code is used as the modulation system) and the format sector capacity is set to be 512 bytes, then the number of sectors in the innermost periphery track of the recording area becomes 56. Assuming that a "block CLD system" (e.g. the recording density is constant in the block) in which the number of sectors on the outermost periphery is set to 107 is used, then the number of tracks necessary for attaining the above capacity becomes 1400 for one side and the track density thereof reaches as large as 1778 tpi. At this time, the track pitch is 14.3 $\mu$m, the track width is 11.4 $\mu$m and the permissible off-track due to the tracking error becomes approx. $\pm 1$ $\mu$m.

The track deflection causing the tracking error includes a primary mode (e.g. eccentricity) and a secondary mode. The former is caused by the chucking error, the eccentricity of the spindle motor, the eccentricity of the disk and the like and the amount thereof is $\pm 15$ $\mu$m, the latter is caused by anisotropic expansion and contraction of the disk medium due to the temperature and moisture and the amount thereof is $\pm 10$ to 15 $\mu$m. Therefore, in the tracking servo system, the servo system is designed to attain the satisfactory following ability with respect to the secondary mode. Assuming that the tracking error for the secondary mode is $\pm 0.5$ $\mu$m, then the gain of the servo system must be set to be not less than 30. Assuming that the "sector servo system" often used in the large-capacity FD or the like is used, the number of servo information items becomes 56 for each rotation, and in this case, a gain of approx. only 10 can be obtained.

In this invention, a "sample servo system" (i.e. the sector servo is one type of the sample servo system) in which two servo information items are created for each sector is used and it is designed to attain a gain which is four times that obtained in a case where the sector servo system is used.

In this invention, a "first-erasing type magnetic head" is used as a countermeasure against the overwrite noise and incomplete-erasing noise. FIG. 21 is a diagram showing a portion near the gap, 40 indicates an R/W gap, metal films 41a and 41b are disposed on both sides of the gap (it is generally called an MIG head) and it is suitable for recording a vertically-oriented high-Hc Ba ferrite medium or metal medium. The gap length is 0.27 $\mu$m and the gap width is 11.4 $\mu$m. The gap length of an erase gap 42 is 2 $\mu$m and the gap width thereof is 14.3 $\mu$m. A ferrite core 43 and a separation film 44 for the two heads are provided. As a distance (d) between the two gaps is set to be smaller, the format efficiency can be more enhanced. However, if the distance is set to be excessively small, the head efficiency is lowered. In the embodiment, the gap distance is set to 180 μm. As a result, it corresponds to 62 bytes on the disk format.

Figure 22:
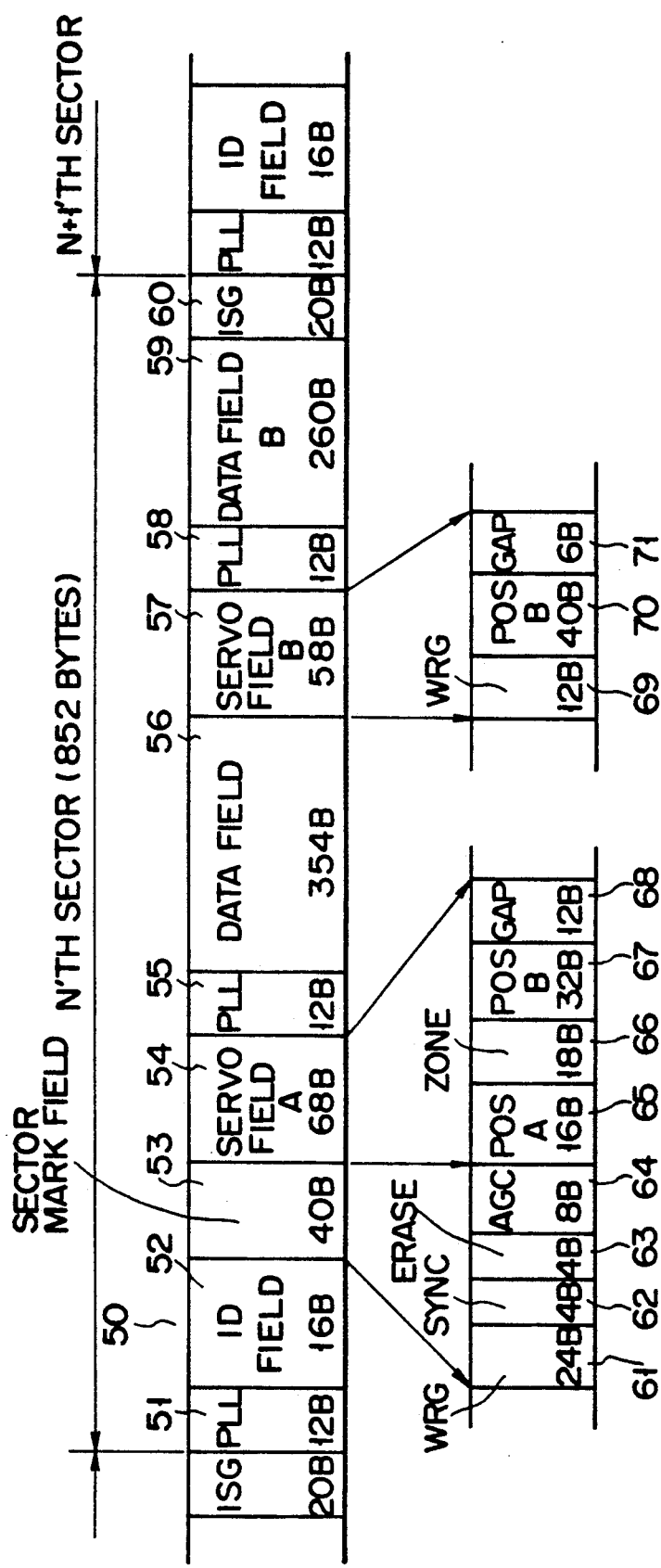
FIG. 22 is a format diagram showing another embodiment relating to a track format of the disk.

FIG. 22 shows an example of a track format in which two servo information items are created in each sector by using a first-erasing type magnetic head and in this case the user can make the format.

In the floppy disk or hard disk using the conventional "sector servo system", a format is formed such that a sector mark and servo information are set in the top portion of the ID field. In this case, an invalid area is made after the ID field when the first-erasing type magnetic head is used, and the format efficiency becomes lower as the recording density becomes higher.

In the embodiment of this invention, the sector mark and servo information are set before the ID field so as to effectively use the invalid area and enhance the format efficiency. In this example, the format is made on the assumption that variation in the rotation speed of the disk is less than ±1%.

A reference numeral 50 indicates a sector of the track format. The sector capacity is 852 bytes and the data capacity is 512 bytes. A sector mark field 53, servo field A 54 and servo field B 54 are previously recorded by a servo writer. Among them, servo information recorded in the servo field is recorded with a deviation of 0.5 track with respect to the data track. A PLL signal 51 for reading the ID field is recorded at the same time as the ID field is recorded in the formatting process. In order to attain the high reliability of the ID data, ID data in the ID field is recorded by overwriting. PLL signals 55 and 58 for reading data fields A 56 and data field B 59 are recorded at the same time as the data field is recorded. The data field has 98 bytes of "LDC (Long Distance Code) system (5-interleave)" which is the same as that used as a correction code in the optical disk in addition to 512 bytes of data section so as to enhance the data reliability. Further, an inter sector gap (ISG) 60 is a field for absorbing write recovery time of the data field B and variation in rotation of the disk. A sector mark field 53 is constructed by a WRG 61 (used for absorbing variation in rotation of the disk, an error (±10 μm) of the gap distance of the first-erasing type magnetic head caused in the manufacturing process and write recovery time of the ID field 52), SYNC 62, ERASE 63 and AGC 64 (used for detecting a sector mark and an AGC signal). If the user does not make the format, the WRG 61 is not necessary. In this case, even if the sector mark field 53 is moved to the front portion of the PLL 51, the format efficiency is kept substantially unchanged.

The servo field A 54 is built in the invalid area caused by use of the first-erasing type magnetic head and is constructed by a POSA 65, ZONE 66, POSB 67 and GAP 68. In the POSA, 2-phase burst position information (e.g. 4-track period) for deriving a speed control signal used at the seeking time is formed. At the time of data writing, the DC erasing operation by the erasing gap is effected immediately after the AGC signal is read, but the transition recovery time is absorbed by the POSA. In the ZONE 66, an index signal (i.e. one for each rotation of the disk), sector zone signal (indicating tracks each having the same number of sectors for each rotation) and data zone signal (i.e. indicating a track in which data is to be recorded) are created as a burst signal. The POSB 67 is precise position information used for position control and has an X burst signal (i.e. front) and a Y burst signal (i.e. rear) alternately formed in each servo track. The GAP 68 is a field for absorbing variation in rotation, an error of the gap distance of the first-erasing type magnetic head caused in the manufacturing process and the like.

The servo field B 57 is a field formed in the data field to enhance the following ability with respect to the track deflection of the disk and is constructed by a WRG 69, POSB 70 and GAP 71. The WRG 69 is a field for absorbing the write recovery time of the data field A 56, and the POSB 70 has precise position information formed therein like the POSB 67 but it is formed to be longer than that the POSB 67 by taking rotational variation into consideration. The GAP 71 is formed to absorb an error of the gap distance of the first-erasing type magnetic head caused in the manufacturing process.

The track format described above is created by considering that the floppy disk used in this embodiment has an extremely high recording density which has not been provided in the prior art. That is, it is constructed to ensure high reliability as a recording medium, and in the format, the ID section is overwritten, an ECC which is strong as that of an optical disk is added to data, and servo information is constructed by a sufficiently long burst. Further, an error in the ID section can be judged from the index signal and sector signal. The AGC signal can be derived not only from the AGC 64 but can be derived from an addition signal of X and Y burst signals of precise position information.

In a case where the recording density is not so high as in the present embodiment, the amount of assignment of bytes to ID, ECC, servo and the like may be reduced to construct a track format having an enhanced format efficiency as a modification.

Next, a (e.g. digital audio) player system specially formed as another embodiment of this invention is explained.

Figure 23:
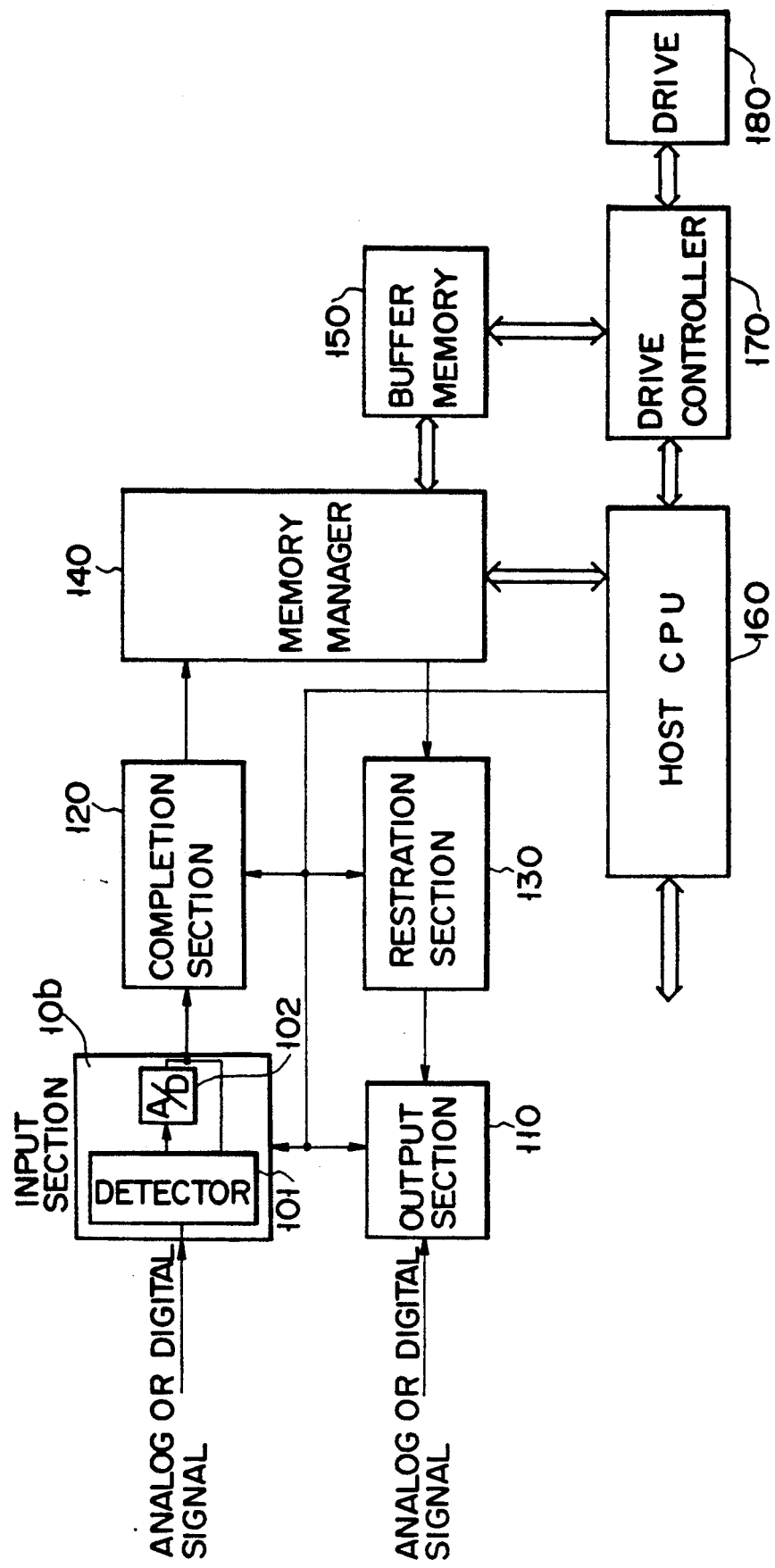
FIG. 23 is a schematic construction view showing the construction of an audio player system according to another embodiment of this invention.

FIG. 23 is a block diagram of the player system and is constructed by an input section 100, output section 120, compression-coding section 120, restoration section 130, memory manager 140, buffer memory 150, host CPU 160, drive controller 170 and drive 180. The input section 100 has input terminals for an analog signal and a digital signal, whether an input signal is an analog signal or digital signal is detected by a detector 101 and the input signal is converted into a digital signal by an A/D converter 102 and output when the input signal is an analog signal. An analog signal is supplied to the compression-coding section 120 after being converted into a digital signal and a digital signal is directly supplied to the compression-coding section 120. An audio signal is converted into a digital signal of 256 kbps or 128 kbps bit rate and supplied to the buffer memory 150 via the memory manager 140. The memory manager 140 controls the buffer memory 150 and the signal input and output. The host CPU 160 sends instructions to the disk controller and memory manager to record data of the buffer memory on the disk according to the driving condition. Data read out from the disk is stored into the buffer memory 150 and then supplied to the restoration section 130 via the memory manager 140. Then, the data is restored to the original digital audio signal in the restoration section 130, supplied to the output section 110 and then output as an analog or digital audio signal. The compression-coding section 120 is selectively set into the 256 kbps or 128 kbps mode by the host CPU 160. Instructions to the host CPU 160 can be selectively given by the user. An area for storing data indicating the selected mode is provided on the disk and an adequate process corresponding to the data is effected at the time of expansion restoration. It is preferable to record the mode data in part of the data field A 56 of FIG. 22. The recording time is 60 minutes for two sides in the 256 kbps mode and 120 minutes for two sides in the 128 kbps. The number of compression modes is not limited to 2 but can be 3 or more and can be freely set by the user.

In this modification, data to be recorded on the disk is subjected to the compression coding, but it is also possible to convert an analog signal into a digital form and then directly record the same on the disk. The recording time obtained at this time is approx. 11 minutes when a digital signal of CD wave is used.

The system may be constructed such that when an error which cannot be corrected occurs in data on each track on one of the disk sides, a preset length of series signals formed in a digital form may be reproduced by using data from the track on the disk side on which no error occurs and if the error size has exceeded a preset size, this fact may be informed to the exterior.

Further, it is also possible to use a spindle motor which rotates the disk for the tracks having the same number of data sectors on the disk at the same rotation speed and rotates at such a rotation speed that the bit rate on each track of the disk can be set to be equal to or higher than twice the bit rate obtained when an analog signal is converted into a digital form.

A disk cartridge of the disk drive for converting an analog signal into a digital form and recording or reproducing the signals described above can be formed as another modification to have a cartridge having load and chucking hub windows of the double-sided heads covered with the shutter having a lock mechanism and a portion of the shutter opening/closing section disposed above the shutter, a flange-like hub which has a hole formed at the center thereof and engaged with the spindle shaft and in which at least one of the end surfaces is formed of magnetic material, the other end surface is formed to have a larger diameter than the former end surface and is attached to the disk and the end surface attached to the disk is formed to be larger than the chucking window of the shell, and a liner formed on a portion of the shell which is set in contact with the flange-like hub.

Further, servo information used when data is recorded for each sector by use of the first-erasing type head is created in two or more positions on each sector and one of the positions may be set directly adjacent to the ID field.

Further, in the above example, the operation of recording the audio signal is explained, but it is also possible to record a video signal from an electronic still camera.

As described above with reference to various embodiments, in this invention, the floppy disk is inserted into the cartridge having all of the windows including the chucking window set in the closed state. Part of the shell near the window for opening or closing the shutter is set at a higher position and the lock mechanism is attached to the shutter so as to prevent entrance of dust and inadvertent damage of the medium. The total size of the cartridge set in the case is set to be approx. A6 size (e.g. paperback size). Therefore, the floppy disk of this invention is preferable from the viewpoint of the size, easy handling, degree of protection from dusts, damages and rough handling, easy transportation and maintenance and can be freely used by the user.

In this invention, the floppy disk can be formed to have a large capacity by using the first-erasing type magnetic head and sample servo and making the line recording density substantially constant, and the recording time of each floppy disk can be set to 60 to 120 minutes which is compatible with that of an audio cassette now used by using the "storage audio coding system" (128 kbps to 256 kbps) which is now internationally examined for standardization. Further, since it is excellent in the "random accessibility" and "repetitive durability" which are the features of the floppy disk, it can be easily used in comparison with the data type.

As described above, if the floppy disk of one embodiment of this invention and an audio player system for the floppy disk are used, an audio signal can be easily recorded or reproduced in a digital form and the floppy disk can be easily used as well as the conventional cassette tape in an audio system in which it is difficult to use the conventional digital audio medium because of its easy transportation and preferable maintenance.

Further, since the floppy disk of this invention does not record a digital source such as CD as it is, a problem relating to an infringement of copyright associated with the DAT may not occur and thus the practical effect thereof is large.

In addition, according to this invention, a disk such as a floppy disk having a small recording capacity can be extremely effectively used.

Further, a preset length of series signals can be recorded as a unit in two divided portions of each track on both sides of the disk or on the side-0 side (i.e. front side) and side-1 side (i.e. rear side) of the disk by using the recording system utilizing the track format formed in the digital form.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A removably disk system comprising:
    a disk which can be recorded on both front and rear surfaces thereof, said disk including tracks on both the front and rear surfaces; and
    liners for holding said disk by pressing the front and rear surfaces of said disk towards each other;
    a disk drive for recording input data on said tracks on both of the front and rear surfaces of said disk;
    wherein said disk drive includes head means having two heads for recording information on both the front and rear surfaces of said disk, and is formed with a gimbal structure, and includes a symmetrical member for moving said heads towards the disk held by said liners from both sides thereof and setting said heads in contact with said disk and said liners maintain a contact state between said heads and said disk and the contact position is defined by servo information, and said disk is a flexible disk on which said servo information for positioning said heads is recorded and which can be selectively replaced.

2. A removable disk system according to claim 1, wherein each of said tracks of said disk is constructed by a plurality of sectors and said disk is rotated at a same rotation speed for tracks having a same number of sectors.

3. The removable disk system according to claim 1, wherein said head means further comprises offset means placed at a predetermined position between said heads and said symmetrical member.

4. The removable disk system according to claim 3, wherein said offset means is a bent portion of said symmetrical member of said head means.

5. The removable disk system according to claim 3, wherein said offset means is a block which is in contact with said symmetrical member of said head means.

6. A removable disk system comprising:
a disk which can be recorded on both front and rear surfaces thereof, said disk having tracks on the front and rear surfaces; and
a disk drive for compression-coding input digital data and recording compression-coded digital data on said tracks on said disk;
wherein said disk drive includes a plurality of different types of processing means for compression-coding, means for selecting one of said plurality of processing means, and means for recording information indicating the type of one of said plurality of processing means selected by said selection means on at least one of said tracks on which the compression-coded data is recorded and which serves as a data field.

7. A removable disk system according to claim 6, wherein said recording means includes:
means for dividing digital data of a preset length into two sections; and
two head means for separately recording data sections divided by said dividing means on the front and rear surfaces of said disk, respectively.

8. A removable disk system according to claim 6, wherein a magnetic material coats at least on one of the two surfaces of said disk, and said disk is disposed inside of a disk cartridge;
said disk cartridge having load windows for loading two heads of said disk drive and a chucking hub window for chucking said disk, said load windows and chucking window being selectively covered with a shutter having a lock mechanism;
said disk cartridge includes a cartridge shell in which part of a shutter opening/closing section is set to be higher than said shutter and including a hole formed at a center portion thereof such that said disk can be engaged with a spindle shaft of said disk drive;
one of said surfaces of said disk has a first end face portion formed of magnetic material and a second end face portion formed to have a larger diameter than said first end face portion and attached to said disk; and
said second end face portion includes a flange-like hub formed to be larger than said chucking window of said disk cartridge, and there is a hub liner formed on part of the shell on which slides a portion of said chucking hub.

9. A removable disk system according to claim 6, wherein said disk drive has a first-erasing type head and a head means for recording/reproducing data for each sector; and
servo information is recorded on at least two locations on said tracks of said disk and at least one of said locations is set immediately behind an ID (identifier) in each sector of said disk.

10. A removable disk system, comprising:
a disk which can be recorded thereon having tracks; and
a disk drive for compression-coding input digital data and recording compression-coded digital data on said tracks of said disk;
wherein said disk drive includes a plurality of different types of processing means for compression-coding, means for selecting one of said plurality of processing means, and means for recording information on said tracks of said disk, indicating which of said plurality of processing means is selected by said selection means and data which has been compression-coded by a selected one of said processing means.

11. A removable disk system, comprising:
a disk having front and rear surfaces which can be recorded on both said front and said rear surfaces thereof, said disk having tracks; and
a disk drive for compression-coding input digital data and recording compression-coded digital data on said tracks of said disk;
wherein said disk drive includes a plurality of different types of processing means for compression-coding, means for selecting one of said plurality of processing means, and means for recording information on said tracks of said disk, indicating which of said plurality of processing means is selected by said selection means and data which has been compression-coded by said processing means; and
wherein said recording means includes:
means for dividing digital data of a preset length into two sections; and
two head means for separately recording data sections divided by said dividing means on said front and back surfaces of said disk, respectively.

12. A removable disk system, comprising:
a disk having two surfaces which can be recorded on both surfaces thereof, said disk having tracks, and a hole at a center portion thereof; and
a disk drive for compression-coding input digital data and recording compression-coded digital data on said tracks of said disk, said disk drive having two heads, and a spindle shaft for engaging with said hole of said disk;
wherein said disk drive includes a plurality of different types of processing means for compression-coding, means for selecting one of said plurality of processing means, and means for recording information on said tracks of said disk indicating which of said plurality of processing means is selected by said selection means and data which has been compression-coded by said processing means;
said disk has at least one of the two surfaces thereof coated with a magnetic material and said disk is disposed within a disk cartridge;
said disk cartridge having load windows for loading said two heads and a chucking hub window for chucking said disk, said load windows and chucking window being selectively covered with a shutter having a lock mechanism;
said disk cartridge includes a cartridge shell in which part of a shutter opening/closing section thereof is set to be higher than said shutter and including a hole at a center of said disk cartridge such that said disk can be engaged with the spindle shaft of said disk drive;

one of said disk surfaces, has a first end face portion formed of magnetic material and a second end face portion formed to have a larger diameter than said first end face portion and attached to said disk; and said second end face portion includes a flange-like hub formed to be larger than said chucking window of said disk cartridge shell, and a hub liner formed on part of a the shell on which slides a portion of said chucking hub.

13. A removable disk system, comprising:

a disk having two surfaces which can be recorded on both surfaces thereof, said disk having tracks, and a hole at a center portion thereof; and a disk drive for compression-coding input digital data and recording compression-coded digital data on said tracks of said disk, said disk drive having two heads, and a spindle shaft for engaging with said hole of said disk;

wherein said disk drive includes a plurality of different types of processing means for compression-coding, means for selecting one of said plurality of processing means, and means for recording information indicating the type of one of said plurality of processing means selected by said selection means on at least one of said tracks on which the compression-coded data is recorded and which serves as a data field;

said disk has at least one of the two surfaces thereof coated with a magnetic material and said disk is disposed within a disk cartridge;

said disk cartridge having load windows for loading said two heads and a chucking hub window for chucking said disk, said load windows and chucking window being selectively covered with a shutter having a lock mechanism;

said disk cartridge includes a cartridge shell in which part of a shutter opening/closing section thereof is set to be higher than said shutter and including a hole at a center of said disk cartridge such that said disk can be engaged with the spindle shaft of said disk drive;

one of said disk surfaces, has a first end face portion formed of magnetic material and a second end face portion formed to have a larger diameter than said first end face portion and attached to said disk; and said second end face portion includes a flange-like hub formed to be larger than said chucking window of said disk cartridge shell, and a hub liner formed on part of a the shell on which slides a portion of said chucking hub.

14. A disk drive for recording input data on tracks of front and rear surfaces of a removable disk supported between liners, comprising:

two heads for recording information on the front and rear surfaces of the disk, said two heads supported by a gimbal structure;

a moving member for moving said heads towards the disk and setting said heads in contact with said disk and said liner maintains a contact state between said heads and said disk and a contact position of said heads and said disk is defined by servo information, recorded on said disk, for indicating a contact position said heads on said disk.

* * * * *